(12) United States Patent
Kanbayashi et al.

(10) Patent No.: US 10,768,430 B2
(45) Date of Patent: Sep. 8, 2020

(54) DISPLAY DEVICE AND HEAD-MOUNTED DISPLAY

(71) Applicant: SHARP KABUSHIKI KAISHA, Sakai, Osaka (JP)

(72) Inventors: Yuuichi Kanbayashi, Sakai (JP); Naru Usukura, Sakai (JP); Hiromi Katoh, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/368,157

(22) Filed: Mar. 28, 2019

(65) Prior Publication Data
US 2019/0302461 A1    Oct. 3, 2019

Related U.S. Application Data

(60) Provisional application No. 62/649,581, filed on Mar. 29, 2018.

(51) Int. Cl.
| | |
|---|---|
| *G02B 27/01* | (2006.01) |
| *G02B 3/08* | (2006.01) |
| *G02B 5/30* | (2006.01) |
| *G02B 5/02* | (2006.01) |

(52) U.S. Cl.
CPC ........... *G02B 27/0172* (2013.01); *G02B 3/08* (2013.01); *G02B 5/0205* (2013.01); *G02B 5/3025* (2013.01); *G02B 2027/0123* (2013.01)

(58) Field of Classification Search
CPC ........ G02B 19/0014; G02B 2027/0123; G02B 27/0172; G02B 3/08; G02B 5/0205; G02B 5/3025
See application file for complete search history.

(56) References Cited

U.S. PATENT DOCUMENTS

| | | | |
|---|---|---|---|
| 6,340,999 B1 * | 1/2002 | Masuda | G02B 6/0038 349/117 |
| 8,092,068 B2 * | 1/2012 | Parker | A61M 21/02 359/599 |

(Continued)

FOREIGN PATENT DOCUMENTS

JP    2006-011143 A    1/2006

OTHER PUBLICATIONS

Teragaki et al.; JP410319242A with translated Abstract, Dec. 4, 1998 (Year: 1998).*

*Primary Examiner* — Dmitriy Bolotin
(74) *Attorney, Agent, or Firm* — ScienBiziP, P.C.

(57) ABSTRACT

A display device includes a display panel having a display surface and a lighting device that supplies light to the display panel. The lighting device includes a light source, and an optical member having at least a light exit surface through which the light emitted by the light source exits toward the display surface of the display panel. The optical member includes a light refraction portion that imparts an anisotropic refraction effect to at least light rays exiting through an edge section of the light exit surface to be oriented toward a center side of the display surface. The display device further includes a low refraction index layer interposed between the display panel and the optical member, and the low refraction index layer has a refraction index lower than at least a refraction index of the optical member.

21 Claims, 14 Drawing Sheets

(56) References Cited

U.S. PATENT DOCUMENTS

| | | | |
|---|---|---|---|
| 2009/0147532 A1* | 6/2009 | Taya | G02B 6/0053 |
| | | | 362/607 |
| 2009/0237576 A1* | 9/2009 | Nelson | G02B 30/27 |
| | | | 349/15 |
| 2012/0113158 A1* | 5/2012 | Goto | G02B 6/0038 |
| | | | 345/690 |
| 2015/0062716 A1* | 3/2015 | Komatsu | G02B 27/0172 |
| | | | 359/630 |
| 2019/0101759 A1* | 4/2019 | Usukura | G02B 6/0038 |

* cited by examiner

DISPLAY DEVICE AND HEAD-MOUNTED DISPLAY

CROSS REFERENCE TO RELATED APPLICATION

This application claims priority from U.S. Provisional Application No. 62/649,581 filed on Mar. 29, 2018. The entire contents of the priority application are incorporated herein by reference.

TECHNICAL FIELD

The present technology described herein relates to a display device and a head-mounted display.

BACKGROUND ART

Conventionally, a liquid crystal display device disclosed in Patent Document 1 is known as one example of a liquid crystal display device. The liquid crystal display device disclosed in Patent Document 1 is provided with a liquid crystal display panel, a side light type light source that emits light to the liquid crystal display panel, a concave unit case that stores the liquid crystal display panel and the light source, a spacer arranged to form an air layer having a predetermined thickness between the liquid crystal display panel and the light source, and a first light diffusion member arranged between the spacer and the liquid crystal display panel.

Patent Document 1: Japanese Unexamined Patent Application Publication No. 2006-11143

The liquid crystal display device disclosed in Patent Document 1 can improve visibility failure caused by a bright spot; however, utilization efficiency of light is inferior.

SUMMARY

The present technology described herein is completed based on the problem described above, and an object of the present technology is to suppress deterioration of display quality while keeping high utilization efficiency of light.

A display device of the present technology described herein includes a display panel having a display surface that displays an image, and a lighting device that emits light to the display panel. The lighting device includes a light source, and an optical member having at least a light emission surface that emits the light emitted from the light source to the display surface of the display panel. The optical member includes a light refraction portion that imparts an anisotropic refraction effect to at least the light emitted from an end side of the light emission surface, to be oriented to a center side of the display surface. The display device further includes a low refraction index layer interposed between the display panel and the optical member. The low refraction index layer has a refraction index lower than at least a refraction index of the optical member.

According to such a configuration, the image can be displayed on the display surface of the display panel by using the light emitted from the lighting device. The lighting device has the light source and the optical member, and the refraction effect is imparted to the light emitted from the light emission surface of the optical member to the display surface of the display panel, by the light refraction portion. The light refraction portion is formed to impart the anisotropic refraction effect to at least the light emitted from the end side of the light emission surface so as to be oriented to the center side of the display surface of the display panel, and therefore the light emitted from the end side of the light emission surface is effectively used for displaying the image on the display panel, so that display quality is improved. On the other hand, in a case in which a foreign substance or the like is present on a light path from the light source to the optical member, the anisotropic refraction effect due to the light refraction portion is imparted to the light emitted from the light emission surface, and thereby display failure such as a bright spot and a black spot caused by the foreign substance or the like might be recognized easily to the contrary. On the other hand, the anisotropic refraction effect due to the light refraction portion is not imparted to all of the light emitted from the light emission surface of the optical member, and therefore at least a little light to be spread to the end side of the display surface is included.

While, the refraction effect is imparted to the light emitted from the light emission surface of the optical member to be spread toward the end side of the display surface, by the low refraction index layer interposed between the optical member and the display panel, and thereby the light travels toward the end side of the display surface in a more wide-angle manner. Accordingly, even in a case in which a foreign substance or the like is present on the light path from the light source to the optical member, the display failure such as a bright spot and a black spot caused by the foreign substance or the like is hardly recognized due to the light, to which the refraction effect is imparted by the low refraction index layer as described above, that travels toward the end side of the display surface in a more wide-angle manner. With this, the utilization efficiency of the light can be kept sufficiently high and the deterioration of the display quality can be suppressed.

According to the present technology described herein, the deterioration of the display quality can be suppressed while keeping the high utilization efficiency of the light.

DETAILED DESCRIPTION

First Embodiment

A first embodiment of the present technology will be described with reference to FIG. 1 to FIG. 4. In the present embodiment, a goggle type head-mounted display (HMD: Head-Mounted Display) HMD and a liquid crystal display device 10 used in the head-mounted display HMD are exemplarily described. In part of each figure, an X axis, a Y axis, and a Z axis are illustrated, so that the illustration in each figure is shown in accordance with the axes.

Figure 1:
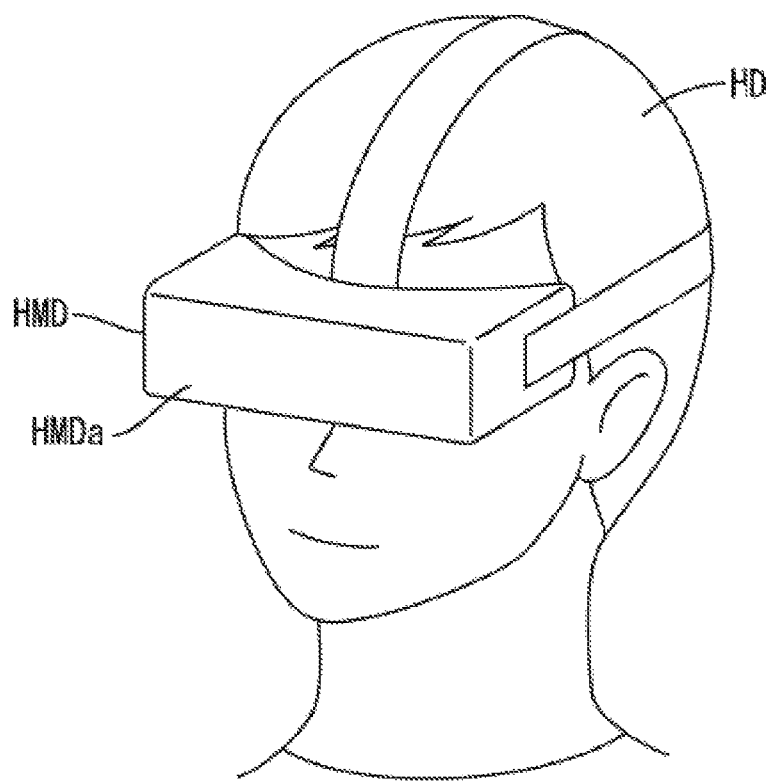
FIG. 1 is a schematic perspective view illustrating a head-mounted display mounted to a head of a user according to a first embodiment.
Figure 2:
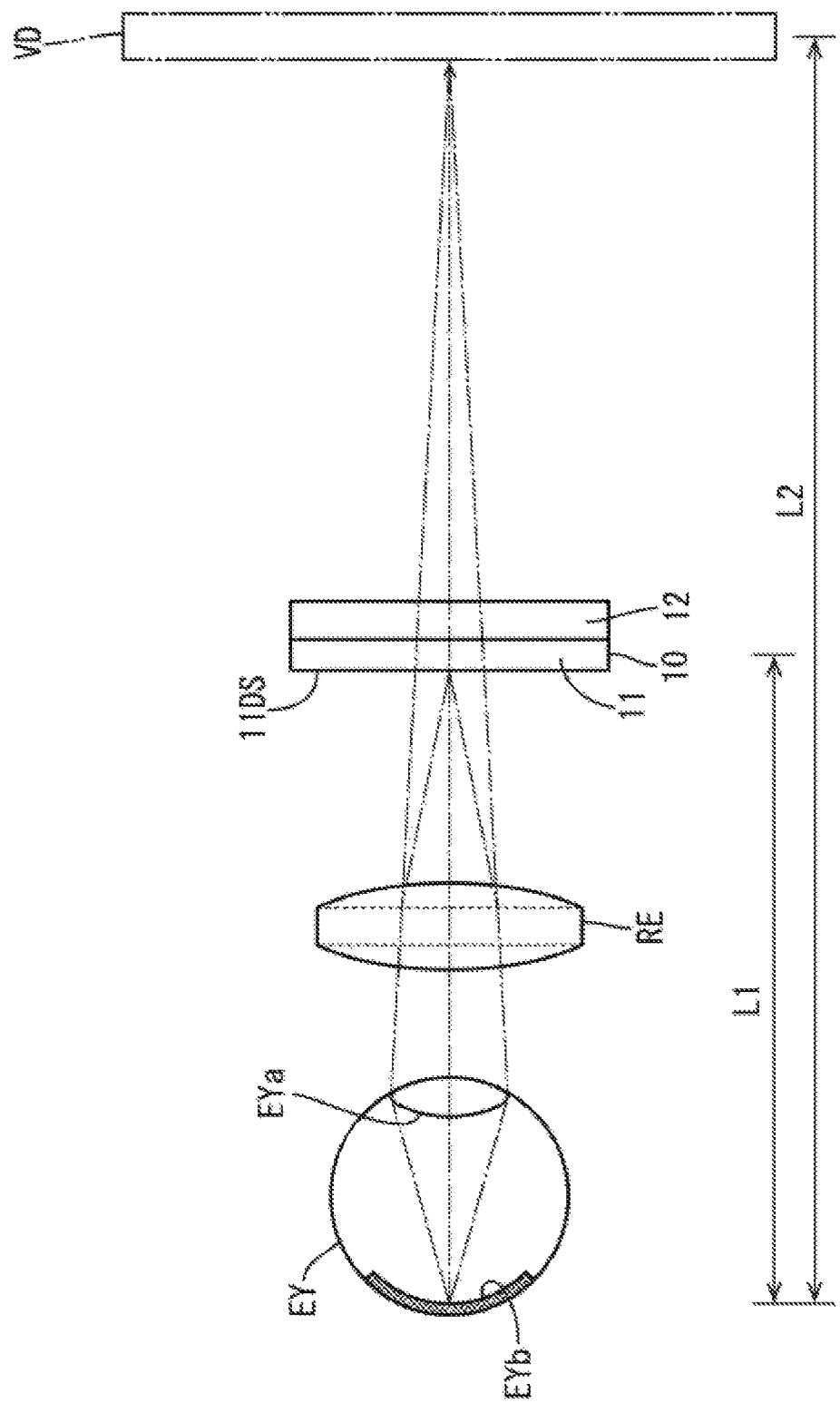
FIG. 2 is a schematic side view illustrating an optical relationship between a liquid crystal display device and a lens portion, which are installed in a head-mounted instrument that forms the head-mounted display, and an eyeball of a user.

As shown in FIG. 1, the goggle type head-mounted display HMD is provided with a head-mounted instrument HMDa mounted to a head HD so as to cover both eyes of a user. As shown in FIG. 2, the head-mounted instrument HMDa is provided with at least the liquid crystal display device 10 that displays an image, and a lens portion RE that images the image, which is displayed on the liquid crystal display device 10, in an eyeball EY of a user. The liquid crystal display device 10 is provided with at least a liquid crystal panel 11, and a backlight device 12 that emits light to the liquid crystal panel 11. The liquid crystal panel 11 corresponds to "a display panel". The backlight device 12 corresponds to "a lighting device". The lens portion RE is arranged to be interposed between the liquid crystal display device 10 and the eyeball EY of a user so as to impart a refraction effect to the transmitted light. By adjusting a focal distance of the lens portion RE, the user recognizes as if the image imaged on a retina EYb through a lens EYa of the eyeball EY is displayed on a virtual display VD virtually arranged at a position far from the eyeball EY by a distance L2 much longer than an actual distance L1 between the eyeball EY and the liquid crystal display device 10. With this, the user can view an enlarged image as a virtual image displayed on the virtual display VD having a display size (for example, several tens of inches to several hundreds of inches) much larger than a display size (for example, several one-tenth inches to several inches) of the liquid crystal display device 10. The eyeball EY, the lens EYa, and the retina EYb correspond to "an eye". One liquid crystal display device 10 may be installed in the head-mounted instrument HMDa to display both of an image for a right eye and an image for a left eye on the liquid crystal display device 10, or alternatively two liquid crystal display devices 10 may be installed in the head-mounted instrument HMDa to display the image for the right eye on one liquid crystal display device 10 and the image for the left eye on another liquid crystal display device 10, respectively. Although an illustration is omitted, an earphone that emits a sound and is attached to an ear of the user, or the like is also installed in the head-mounted instrument HMDa.

The liquid crystal panel 11 and the backlight device 12 that form the liquid crystal display device 10 are sequentially described. As shown in FIG. 2, the liquid crystal panel 11 is formed in a rectangular plate shape as a whole, and a plate surface at a side of the lens portion RE is formed as a display surface 11DS that displays an image. The liquid crystal panel 11 is provided with at least a pair of glass substrates 11A and 11B stuck to form a predetermined gap therebetween, and a liquid crystal layer including liquid crystal molecules that are sealed between the substrates 11A and 11B and are changed in an optical characteristic in accordance with applying of an electric field. In one substrate 11A, a switching element connected to a source line and a gate line, which are orthogonally intersected to each other, and a pixel electrode arranged in a rectangular region surrounded by the source line and the gate line so as to be connected to the switching element are arranged in plane in a matrix manner, and also an oriented film or the like is arranged. The one substrate 11A corresponds to "an array substrate" or "an active matrix substrate". The switching element is formed by, for example, a TFT and the like. In another substrate 11B, a color filter in which coloring portions for R (red), G (green), and B (blue) are arranged in plane in a matrix manner with a predetermined arrangement, and a light shielding layer arranged between the coloring portions in a matrix manner, a solid counter electrode arranged to face the pixel electrode, and an oriented film or the like are arranged. The other substrate 11B corresponds to "a counter substrate" or "a CF substrate". The light shielding layer corresponds to "a black matrix". Polarizing plates 11C are arranged at outer sides of both substrates 11A and 11B, respectively.

Figure 3:
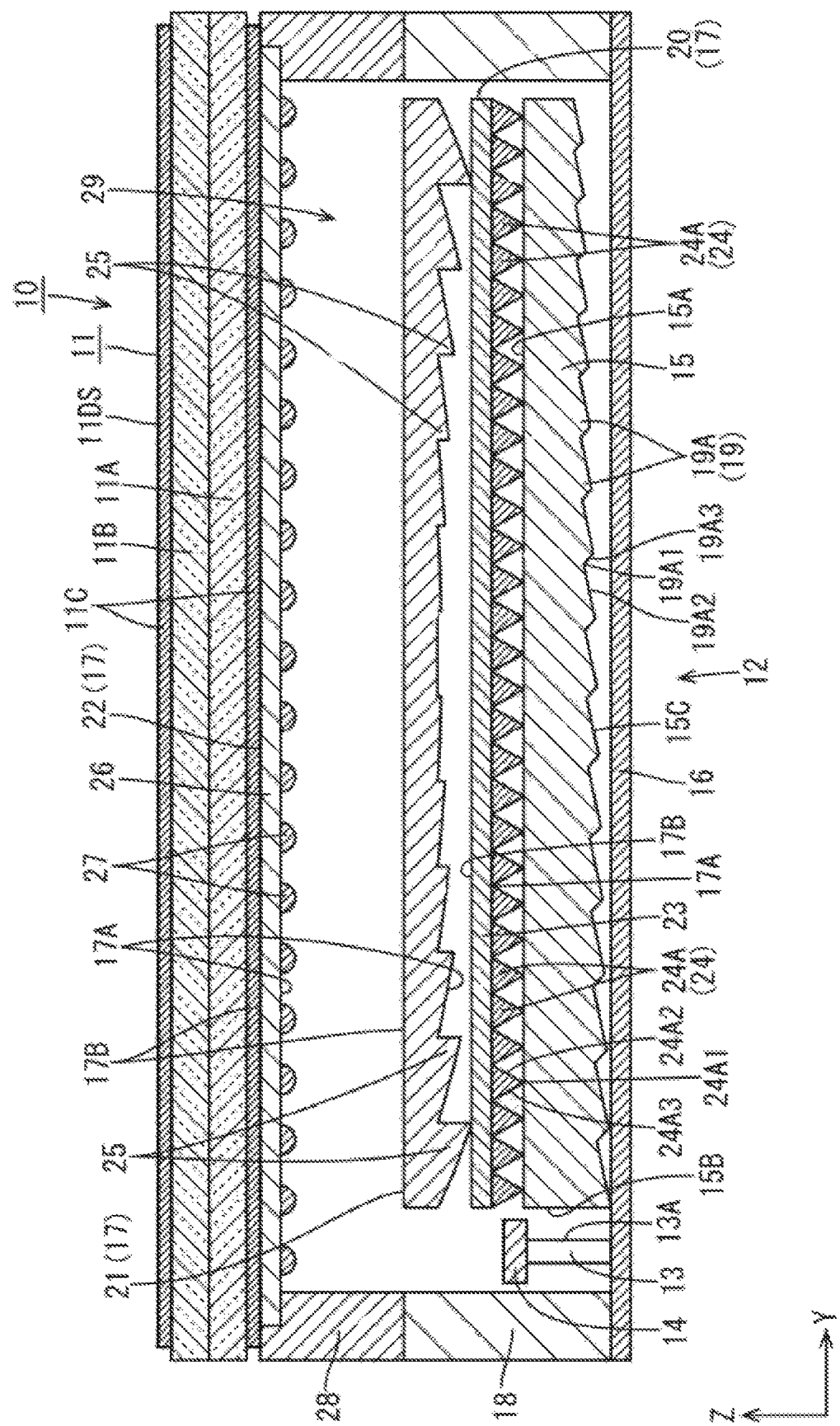
FIG. 3 is a cross-sectional view taken along a long side direction of the liquid crystal display device.

Next, the backlight device 12 is described. As shown in FIG. 3, the backlight device 12 is provided with at least an LED 13, an LED substrate 14 on which the LED 13 is mounted, a light guide plate 15 that guides light from the LED 13, a reflection sheet 16 arrange at a back side of the light guide plate 15, optical sheets 17 arranged to be interposed between the light guide plate 15 and the liquid crystal panel 11, and a frame 18 that supports a part of the optical sheet 17 and the liquid crystal panel 11 from a back side, namely a side of the light guide plate 15. The LED 13 corresponds to "a light source". The LED substrate 14 corresponds to "a light source substrate". The reflection sheet 16 corresponds to "a reflection member". The backlight device 12 is formed as a one-sided light incident type device and an edge light type device in which the light of the LED 13 is incident on the light guide plate 15 from one side thereof.

As shown in FIG. 3, the LED 13 is formed such that an LED chip is sealed on a substrate fixed to the LED substrate 14, by a sealing agent. The LED 13 is formed such that the LED chip emits single color light, for example, blue light, and a phosphor is compounded and dispersed to the sealing agent, so that the LED 13 emits white light as a whole. The phosphor includes a yellow phosphor, a green phosphor, a red phosphor, and the like. The LED 13 is formed as a so-called side surface light emission type LED in which a surface of the LED 13 adjacent to a mount surface to the LED substrate 14 is formed as a light emitting surface 13A. The LED substrate 14 is arranged such that a plate surface thereof is parallel to a plate surface of the light guide plate 15. A plate surface of the LED substrate 14 at a back side is formed as the mount surface for the LED 13. The LEDs 13 are mounted to the mount surface along an X axis direction with intervals.

Figure 4:
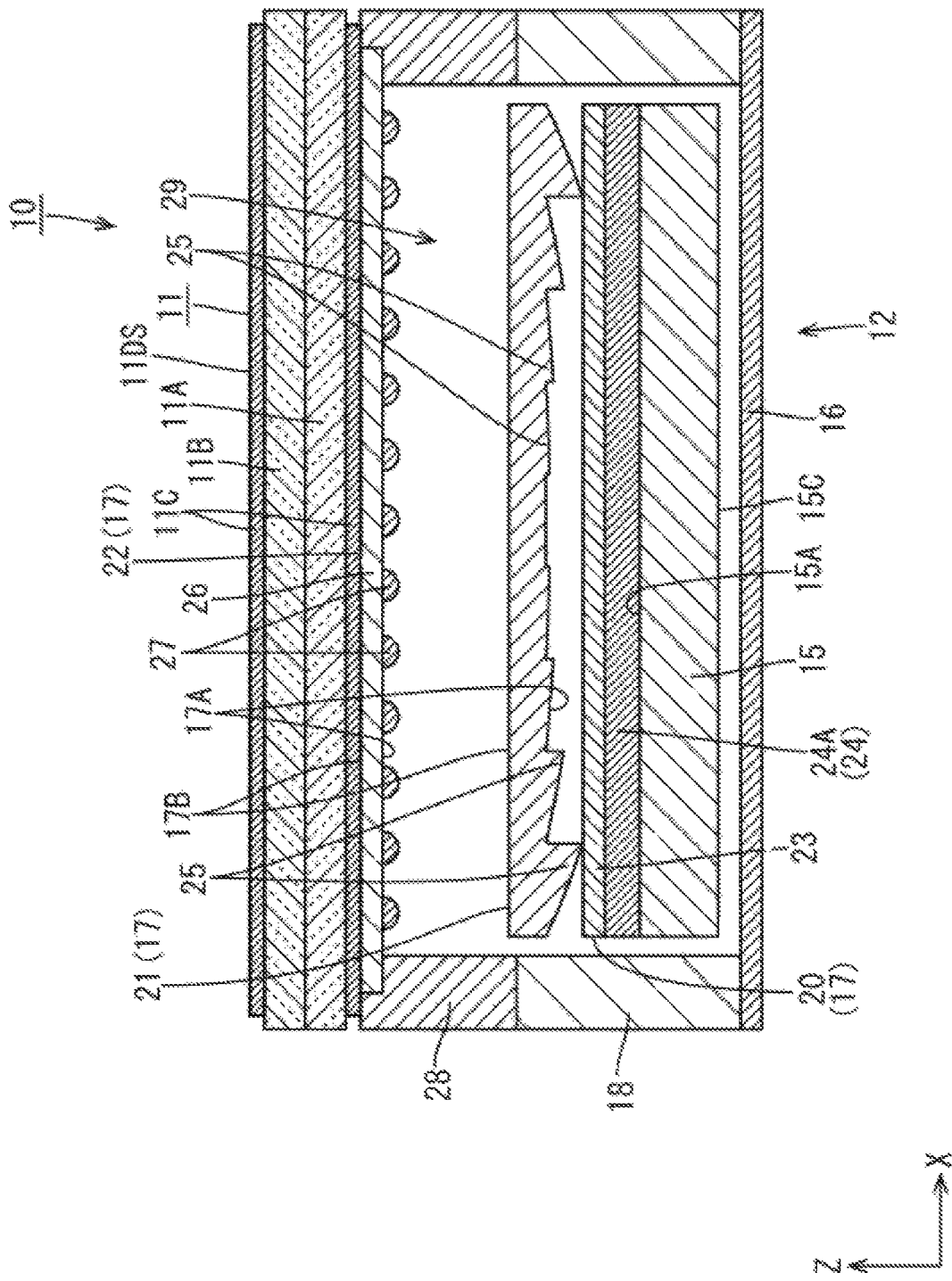
FIG. 4 is a cross-sectional view taken along a short side direction of the liquid crystal display device.

The light guide plate 15 is formed by a synthetic resin material (for example, an acryl resin such as PMMA) substantially transparent having a refraction index sufficiently higher than that of air. As shown in FIG. 3 and FIG. 4, the light guide plate 15 is formed in a plate shape. A plate surface of the light guide plate 15 is arranged to be parallel to a plate surface, namely the display surface 11DS, of the liquid crystal panel 11. In the light guide plate 15, a long side direction of the plate surface coincides with a Y axis direction in each figure, a short side direction coincides with the X axis direction, and a plate thickness direction orthogonal to the plate surface coincides with a Z axis direction. The plate surface facing the liquid crystal panel 11 and the optical sheet 17 among a pair of the plate surfaces of the light guide plate 15 serves as a light exit plate surface 15A that emits the light guided through an inside. As shown in FIG. 4, the light guide plate 15 is arranged right below the liquid crystal panel 11 and the optical sheet 17, and an end surface at one short side among outer peripheral end surfaces of the light guide plate 15 is arranged to face the light emitting surface 13A of the LED 13 and serves as a light incident end surface (light guide plate light incident surface) 15B on which the light from the light emitting surface 13A is incident. The light guide plate 15 guides the light emitted from the LED 13 along the X axis direction, namely a direction of an arrangement of the LED 13 and the light guide plate 15, to be introduced from the light incident end surface 15B and to be propagated inside the light guide plate 15. After that, the light guide plate 15 emits the light from the plate surface such that the light is directed upward to a side of the optical sheet 17, namely a front side and a light exit side, along the Z axis direction, namely an arrangement direction of the liquid crystal panel 11 and the optical sheet 17, and the light guide plate 15. The light guide plate 15 is formed in a substantially wedge shape in section such that the thickness thereof is thinner as being far away from the light incident end surface 15B with respect to the Y axis direction. With such a configuration, an effect improving light emission efficiency can be obtained, compared to a configuration in which the light guide plate is formed in a plate shape having a uniform plate thickness. A normal direction of the light incident end surface 15B coincides with the Y axis direction, and an orthogonal direction orthogonal to the normal direction of the light incident end surface 15B on the light exit plate surface 15A coincides with the X axis direction.

As shown in FIG. 3, a light exit reflection portion 19 that reflects the light propagated in the light guide plate 15 so as to promote light exit from the light exit plate surface 15A is formed on a light exit opposite plate surface 15C at a side opposite to the light exit plate surface 15A among a pair of the plate surfaces of the light guide plate 15. The light exit reflection portion 19 is formed by unit reflection portions 19A, each of which is extended along the X axis direction on the light exit opposite plate surface 15C of the light guide plate 15 and is formed in a groove having a substantially triangular shape in section, arranged along the Y axis direction with intervals (intermittent arrangement). The unit reflection portion 19A corresponds to "a prism". The unit reflection portion 19A is provided with an apex part 19A1, a first inclined surface 19A2 arranged at a side of the LED 13, namely a side of the light incident end surface 15B, in the Y axis direction with respect to the apex part 19A1, and a second inclined surface 19A3 arranged at a side opposite to the side of the LED 13 in the Y axis direction with respect to the apex part 19A1. The first inclined surface 19A2 corresponds to "a main reflection surface" or "a light source side inclined surface". The second inclined surface 19A3 corresponds to "a re-incident surface" or "a non-light source side inclined surface". The first inclined surface 19A2 is formed to have an upward gradient to be gradually close to the light exit plate surface 15A toward the side opposite to the LED 13 in the Y axis direction. The second inclined surface 19A3 is formed to have a downward gradient to be gradually far away from the light exit plate surface 15A toward the side opposite to the LED 13 in the Y axis direction. The unit reflection portion 19A reflects the light on the first inclined surface 19A2 to generate the light having an incident angle to the light exit plate surface 15A not exceeding a critical angle, so that the light exit from the light exit plate surface 15A is promoted. Contrastingly, when the light having the incident angle to the first inclined surface 19A2 not exceeding the critical angle is transmitted through the first inclined surface 19A2, the second inclined surface 19A3 makes the transmitted light incident again on the light guide plate 15.

As shown in FIG. 3 and FIG. 4, the reflection sheet 16 is arranged such that a plate surface is parallel to each of the plate surfaces of the liquid crystal panel 11 and the light guide plate 15 so as to cover the light exit opposite plate surface 15C at the side opposite to the light exit plate surface 15A of the light guide plate 15. The reflection sheet 16 is superior in light reflection performance, and therefore the reflection sheet 16 can raise the light leaked from the light exit opposite plate surface 15C of the light guide plate 15, toward a front side, namely the light exit plate surface 15A, efficiently. The reflection sheet 16 is formed slightly larger than the light guide plate 15 in outer shape. The reflection sheet 16 is arranged such that an end portion at one long side is protruded to the side of the LED 13 with respect to the light incident end surface 15B.

As shown in FIG. 3, the optical sheet 17 is formed in a sheet shape, and a plate surface of the optical sheet 17 is parallel to each of the plate surfaces of the liquid crystal panel 11 and the light guide plate 15. The optical sheet 17 is arranged to be interposed between the liquid crystal panel 11 and the light guide plate 15 in the Z axis direction. The optical sheet 17 is formed to emit the light emitted from the LED 13 to the liquid crystal panel 11 while imparting a predetermined optical effect to the light. The optical sheet 17 is formed such that a back side, namely a plate surface directed to a side of the light exit plate surface 15A of the light guide plate 15, serves as a light incident surface 17A on which the light is incident, and a front side, namely a plate surface directed to a side of the display surface 11DS of the liquid crystal panel 11, serves as a light exit surface 17B from which the light is emitted. Total three sheets are included in the optical sheet 17, namely an anisotropic light condensing sheet 20, a Fresnel lens sheet 21, and a diffusion sheet 22 are arranged in this order from the back side of the optical sheet 17. The anisotropic light condensing sheet 20 corresponds to "an anisotropic light condensing member". The Fresnel lens sheet 21 corresponds to "an optical member". The diffusion sheet 22 corresponds to "a diffusion member". Hereinafter, these sheets 20 to 22 are sequentially described.

As shown in FIG. 3, the anisotropic light condensing sheet 20 is arranged to be overlapped with a front side, namely a side of the liquid crystal panel 11 or a light exit side of the light exit plate surface 15A of the light guide plate 15 so as to impart an anisotropic light condensing effect to the light emitted from the light exit plate surface 15A. The anisotropic light condensing sheet 20 is formed by a base material 23 formed of a substantially transparent synthetic resin, and an anisotropic light condensing layer 24 arranged at a rear surface, namely the light incident surface 17A, of the base material 23 so as to impart a light condensing effect to the incident light. The anisotropic light condensing layer 24 is formed by prisms 24A protruded toward the back side, namely a side of the light guide plate 15, from the light incident surface 17A along the Z axis direction. The prism 24A is formed in a substantially mountain shape in section taken along the Y axis direction, namely a normal direction of the light incident end surface 15B and the Z axis direction, and the prism 24A is extended linearly along the X axis direction, namely an orthogonal direction orthogonal to both of the normal direction of the light incident end surface 15B and the Z axis direction. The prisms 24A are arranged along the Y axis direction on the light incident surface 17A. Each of the prisms 24A is formed in a substantially isosceles triangle in section, and is provided with a pair of inclined surfaces 24A2 and 24A3 interposing an apex part 24A1. When the light is incident on the prism 24A having such a configuration from a side of the light guide plate 15, the incident light in the prism 24A is refracted by an interface between each of the inclined surfaces 24A2 and 24A3 and an air layer at an outside, so that the incident light is raised upward in a front direction, namely the normal direction of the light exit surface 17B. Such a light condensing effect is applied to the light incident on the prism 24A along the Y axis direction; however, the light condensing effect is hardly applied to the light incident on the prism 24A along the X axis direction orthogonal to the Y axis direction. Accordingly, the anisotropic light condensing layer 24 according to the present embodiment imparts the anisotropic light condensing effect to the light such that a light condensing degree in the Y axis direction, which is an arrangement direction of the prisms 24A, is made larger, and the light condensing degree in the X axis direction, which is an extension direction of each prism 24A, is made smaller. In the anisotropic light condensing sheet 20, the Y axis direction in which the light condensing degree due to the anisotropic light condensing layer 24 is made larger, serves as a light condensing direction, namely a high light condensing direction, while the X axis direction in which the light condensing degree due to the anisotropic light condensing layer 24 is made smaller and the light condensing effect is hardly imparted, serves as a non-light condensing direction, namely a low light condensing direction. In this way, the anisotropic light condensing sheet 20 has an anisotropic light condensing function. With this, utilization efficiency of light can be improved.

As shown in FIG. 3 and FIG. 4, the Fresnel lens sheet 21 is formed of a substantially transparent synthetic resin. The Fresnel lens sheet 21 has a Fresnel lens 25 in the light incident surface 17A. The Fresnel lens 25 corresponds to "a light refraction portion". Examples of the material of the Fresnel lens sheet 21 include acyl resin, PET (polyethylene terephthalate), PC (polycarbonate), PP (polypropylene), and the like. A refraction index thereof is set to a range of, for example, from 1.5 to 1.6. The Fresnel lens 25 is formed by arranging partially spherical surfaces on a surface of the Fresnel lens 25 in a stepped manner. In the Fresnel lens 25, a curvature of the surface is larger at an outer peripheral end side than at a central side of the Fresnel lens sheet 21. Accordingly, the Fresnel lens 25 imparts a refraction effect to the light emitted from the light exit surface 17B of the Fresnel lens sheet 21 to be oriented to the center side in the display surface 11DS of the liquid crystal panel 11. Specifically, a larger angle, namely a strong refraction effect, is imparted to the light emitted from the outer peripheral end side in the light exit surface 17B of the Fresnel lens sheet 21 to be oriented to the center side in the display surface 11DS by the Fresnel lens 25, compared to the light emitted from the center side in the light exit surface 17B. That is, the Fresnel lens 25 has an anisotropic refraction function in which a refraction effect imparted to the exit light is different in accordance with an emitted position of the light in the light exit surface 17B of the Fresnel lens sheet 21. With this, the light emitted from the end side in the light exit surface 17B of the Fresnel lens sheet 21 is effectively used for displaying an image on the liquid crystal panel 11, so that display quality is improved. According to the Fresnel lens 25, a component of astigmatism can be removed. Accordingly, the utilization efficiency of the light is further improved, and the liquid crystal display device 10 can be made thin. On the other hand, in a case in which a foreign substance or the like is present on a light path from the LED 13 to the Fresnel lens sheet 21, when the anisotropic refraction effect due to the Fresnel lens 25 is imparted to the light emitted from the light exit surface 17B of the Fresnel lens sheet 21, the display failure such as a bright spot and a black spot caused by the foreign substance or the like might be recognized easily to the contrary. "The light path" described above includes, for example, the light guide plate 15, the reflection sheet 16, the anisotropic light condensing sheet 20 and the like. "The foreign substance" described above includes dust and the like. On the other hand, the anisotropic refraction effect due to the Fresnel lens 25 is not always imparted to all of the light emitted from the light exit surface 17B of the Fresnel lens sheet 21, and therefore at least a little light to be spread to the end side of the display surface 11DS is included.

As shown in FIG. 3 and FIG. 4, the diffusion sheet 22 is formed by a base material 26 formed of a substantially transparent synthetic resin, and a diffusion layer 27 arranged on a back surface of the base material 26, namely arranged in the light incident surface 17A so as to impart a diffusion effect to the incident light. The diffusion layer 27 is formed by many diffusion particles distributed at random in the light incident surface 17A of the base material 26. A Haze value of the diffusion sheet 22 is preferably set to 50% or less, and more preferably set to 30% or less. According to the diffusion sheet 22, display failure caused by a member arranged at the back side of the diffusion sheet 22 can be hardly seen by imparting the diffusion effect to the light directed to the display surface 11DS of the liquid crystal panel 11. "The member" described above includes the light guide plate 15, the reflection sheet 16, the anisotropic light condensing sheet 20, the Fresnel lens sheet 21 and the like.

As shown in FIG. 3 and FIG. 4, the frame 18 is formed by a synthetic resin having a surface exhibiting white color or the like and having superior reflective performance. The frame 18 is formed in a frame shape that surrounds a whole periphery of the light guide plate 15. One short side portion, which is a left side portion of the frame 18 shown in FIG. 3, is formed to interpose the LED 13 in conjunction with the light incident end surface 15B of the light guide plate 15. A fixing member 28 is fixed to a surface directed to a front side of the frame 18. The fixing member 28 corresponds to "a support member". The fixing member 28 is formed by a both-sided adhesive tape to which an adhesive agent is applied to both of a front surface and a back surface of a sheet-like base material. Example of the both-sided adhesive tape includes a rim tape and the like. The fixing member 28 is fixed to the back surface of the liquid crystal panel 11 and the diffusion sheet 22, so that each of the liquid crystal panel 11 and the diffusion sheet 22 is supported at a predetermined position in the Z axis direction.

As shown in FIG. 3 and FIG. 4, the liquid crystal panel 11 and the diffusion sheet 22 supported by the fixing member 28 is arranged so as to interpose a low refraction index layer 29 in conjunction with the Fresnel lens sheet 21 arranged to be overlapped at the back side of the liquid crystal panel 11 and the diffusion sheet 22. The low refraction index layer 29 has a refraction index lower than that of the Fresnel lens sheet 21. The low refraction index layer 29 is specifically formed by an air layer. That is, a gap is formed between the liquid crystal panel 11 and the diffusion sheet 22, and the Fresnel lens sheet 21 in the Z axis direction by the fixing member 28 that supports the liquid crystal panel 11 and the diffusion sheet 22 from the back side, so that the air layer to serve as the low refraction index layer 29 having a thickness of the gap is secured. With this, a cost for arranging the low refraction index layer 29 can be made low. The refraction index of the low refraction index layer 29 formed by the air layer is equal to approximately 1, which is lower than the refraction index of from 1.5 to 1.6 of the Fresnel lens sheet 21. Consequently, the difference between the refraction indexes of the low refraction index layer 29 and the Fresnel lens sheet 21 is maximized. The Haze value of the low refraction index layer 29 formed by the air layer is equal to approximately 0%. The thickness of the low refraction index layer 29 formed by the air layer is preferably set to, for example, a range of from 0.2 mm to 3 mm, and more preferably set to a range of from 0.5 mm to 1.5 mm.

Functions and effects of the low refraction index layer 29 are described. That is, the refraction effect in accordance with the difference of the refraction indexes between the light exit surface 17B of the Fresnel lens sheet 21 and the low refraction index layer 29, is imparted to the light, which is included in the light emitted from the light exit surface 17B of the Fresnel lens sheet 21 and is spread toward the end side of the display surface 11DS of the liquid crystal panel 11, at the interface between the light exit surface 17B and the low refraction index layer 29, and thereby the light travels toward the end side of the display surface 11DS in a more wide-angle manner. Accordingly, even in a case in which a foreign substance or the like is present on the light path from the LED 13 to the Fresnel lens sheet 21, the display failure such as a bright spot and a black spot caused by the foreign substance or the like is hardly recognized due to the light, to which the refraction effect is imparted by the low refraction index layer 29 as described above, that travels toward the end side of the display surface 11DS in a more wide-angle manner. With this, the utilization efficiency of the light can be kept sufficiently high in conjunction with the fact that the Haze value of the diffusion sheet 22 can be made low, and the deterioration of the display quality can be suppressed. In addition, the low refraction index layer 29 is formed as an air layer, and thereby the difference of the refraction indexes between the low refraction index layer 29 and the Fresnel lens sheet 21 is maximized, so that the refraction effect imparted to the light emitted from the Fresnel lens sheet 21 is made larger, and therefore the display failure can be further hardly recognized. In the head-mounted display HMD, a user views an image, which is enlarged based on the image displayed on the display surface 11DS of the liquid crystal panel 11, through the lens portion RE and the like. Since the display failure such as a bright spot and a black spot caused by the foreign substance or the like can be hardly recognized by the low refraction index layer 29, the superior display quality can be obtained.

As described above, the liquid crystal display device (display device) 10 of the present embodiment includes the liquid crystal panel (display panel) 11 having the display surface 11DS that displays an image, and the backlight device (lighting device) 12 that emits light to the liquid crystal panel 11. The backlight device 12 includes the LED (light source) 13, the Fresnel lens sheet (optical member) 21 having at least the light exit surface 17B that emits the light emitted from the LED 13, to the display surface 11DS of the liquid crystal panel 11. The Fresnel lens sheet 21 includes the Fresnel lens 25 serving as a light refraction portion that imparts the anisotropic refraction effect to at least the light emitted from the end side of the light exit surface 17B, to be oriented to the center side of the display surface 11DS. The liquid crystal display device 10 further includes the low refraction index layer 29 interposed between the liquid crystal panel 11 and the Fresnel lens sheet 21. The low refraction index layer 29 has the refraction index lower than at least the refraction index of the Fresnel lens sheet 21.

According to such a configuration, an image can be displayed on the display surface 11DS of the liquid crystal panel 11 by using the light emitted by the backlight device 12. The backlight device 12 has the LED 13 and the Fresnel lens sheet 21, and therefore the refraction effect is imparted to the light emitted from the light exit surface 17B of the Fresnel lens sheet 21 to the display surface 11DS of the liquid crystal panel 11, by the Fresnel lens 25. The Fresnel lens 25 is formed to impart the anisotropic refraction effect to at least the light emitted from the end side of the light exit surface 17B, so as to be oriented to the center side of the display surface 11DS of the liquid crystal panel 11, and therefore the light emitted from the end side of the light exit surface 17B is effectively used for displaying the image on the liquid crystal panel 11, and accordingly the display quality can be improved. On the other hand, in a case in which a foreign substance or the like is present on a light path from the LED 13 to the Fresnel lens sheet 21, when the anisotropic refraction effect due to the Fresnel lens 25 is imparted to the light emitted from the light exit surface 17B, the display failure such as a bright spot and a black spot caused by the foreign substance or the like might be recognized easily to the contrary. On the other hand, the anisotropic refraction effect due to the Fresnel lens 25 is not imparted to all of the light emitted from the light exit surface 17B of the Fresnel lens sheet 21, and therefore at least a little light to be spread to the end side of the display surface 11DS is included.

While, when the refraction effect is imparted to the light emitted from the light exit surface 17B of the Fresnel lens sheet 21 to be spread toward the end side of the display surface 11DS, by the low refraction index layer 29 interposed between the Fresnel lens sheet 21 and the liquid crystal panel 11, the light travels toward the end side of the display surface 11DS in a more wide-angle manner. Accordingly, even in a case in which a foreign substance or the like is present on the light path from the LED 13 to the Fresnel lens sheet 21, the display failure such as a bright spot and a black spot caused by the foreign substance or the like is hardly recognized due to the light, to which the refraction effect is imparted by the low refraction index layer 29 as described above, that travels toward the end side of the display surface 11DS in a more wide-angle manner. With this, the utilization efficiency of the light can be kept sufficiently high and the deterioration of the display quality can be suppressed.

The light refraction portion is formed by the Fresnel lens 25 arranged on the light exit surface 17B of the optical sheet and having a curvature larger at the outer peripheral end side than at the central side of the light exit surface 17B. With such a configuration, since the Fresnel lens 25 has a curvature larger at the outer peripheral end side than at the central side of the light exit surface 17B, the strong refraction effect is imparted to the light emitted from the outer peripheral end side compared to the light emitted from the central side of the light exit surface 17B. With this, the utilization efficiency of the light can be improved, and the liquid crystal display device 10 can be made thin.

The liquid crystal display device 10 is provided with the light guide plate 15 including the light incident end surface 15B, which is at least a part of the outer peripheral end surface of the light guide plate 15, on which the light emitted from the LED 13 is incident, and the light exit plate surface 15A, which is one of a pair of the plate surfaces of the light guide plate 15 and is formed to emit the light, the light guide plate 15 being arranged to be overlapped with the Fresnel lens sheet 21, and the anisotropic light condensing sheet (anisotropic light condensing member) 20 interposed between the light guide plate 15 and the Fresnel lens sheet 21. The anisotropic light condensing sheet 20 has the anisotropic light condensing layer 24 that imparts the anisotropic light condensing effect to the light such that the light condensing degree in the normal direction of the light incident end surface 15B is made larger and the light condensing degree in the orthogonal direction orthogonal to the normal direction is made smaller. With such a configuration, the light incident on the light incident end surface 15B of the light guide plate 15 from the LED 13 is propagated in the light guide plate 15, and then the light is emitted from the light exit plate surface 15A to be incident on the anisotropic light condensing sheet 20. In the anisotropic light condensing sheet 20, the high light condensing effect is imparted to the light in the normal direction of the light incident end surface 15B of the light guide plate 15 by the anisotropic light condensing layer 24, while the light condensing effect imparted to the light in the orthogonal direction orthogonal to the normal direction is made smaller. With this, the utilization efficiency of the light can be further improved.

The liquid crystal display device 10 is provided with the diffusion sheet (diffusion member) 22 arranged to be interposed between the liquid crystal panel 11 and the low refraction index layer 29 so as to diffuse the light emitted from the light exit surface 17B of the Fresnel lens sheet 21. With such a configuration, the diffusion effect is imparted to the light directed to the liquid crystal panel 11 from the low refraction index layer 29, by the diffusion sheet 22. With this, the display failure such as a bright spot and a black spot caused by the foreign substance or the like can be further hardly recognized.

The liquid crystal display device 10 is provided with the fixing member (support member) 28 that supports at least the liquid crystal panel 11 from the side of the Fresnel lens sheet 21. With such a configuration, since at least the liquid crystal panel 11 is supported by the fixing member 28 from the side of the Fresnel lens sheet 21, a space for arranging the low refraction index layer 29 can be secured between the Fresnel lens sheet 21 and the liquid crystal panel 11.

The low refraction index layer 29 is formed by an air layer. With such a configuration, the air layer serving as the low refraction index layer 29 can be interposed between the Fresnel lens sheet 21 and the liquid crystal panel 11 by using the fixing member 28 to support at least the liquid crystal panel 11. The air layer has the refraction index, which is the secondly lowest following that of a vacuum layer, and therefore the different of the refraction indexes between the Fresnel lens sheet 21 and the low refraction index layer 29 can be maximized. With this, the display failure can be further hardly recognized. In addition, the cost for arranging the low refraction index layer 29 can be made low.

The head-mounted display HMD according to the present embodiment at least includes the liquid crystal display device 10, the lens portion RE that images an image displayed on the liquid crystal display device 10 in the eyeball (eye) EY of a user, and the head-mounted instrument HMDa including the liquid crystal display device 10 and the lens portion RE to be mounted to the head HD of the user, as described above. According to the head-mounted display HMD having such a configuration, when the user uses the head-mounted display HMD in a state in which the head-mounted instrument HMDa is mounted to the head HD, the image displayed on the liquid crystal display device 10 is imaged in the eyeball EY of the user through the lens portion RE, and accordingly the user can view the enlarged image of the image displayed on the liquid crystal display device 10. Here, since the anisotropic refraction effect is imparted to the light emitted from the end side of the light exit surface 17B of the Fresnel lens sheet 21 forming the backlight device 12 installed in the liquid crystal display device 10 such that the light is oriented to the center side of the liquid crystal panel 11 by the Fresnel lens 25, the light can be delivered efficiently to the eyeball EY of the user that views the enlarged image of the image displayed on the liquid crystal panel 11. In this way, the user views the enlarged image of the image displayed on the liquid crystal panel 11, and since the display failure such as a bright spot and a black spot caused by the foreign substance is hardly recognized by the low refraction index layer 29, the superior display quality can be obtained.

Second Embodiment

A second embodiment of the present technology will be described with reference to FIG. 5. In the second embodiment, a configuration in which a frame 118 is modified is described. An overlapped description relating to a configuration, a function and an effect similar to those of the first embodiment, is omitted.

Figure 5:
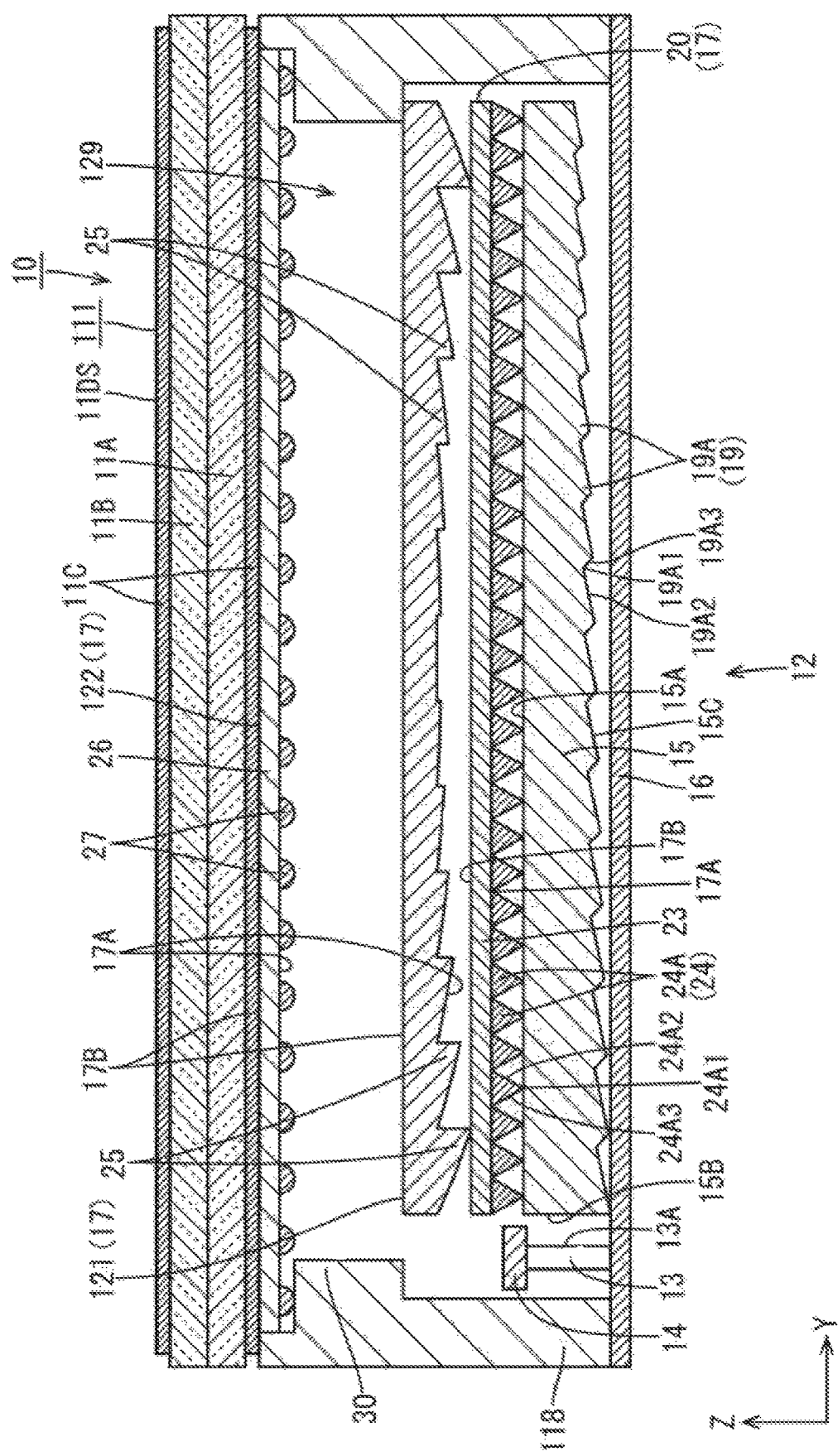
FIG. 5 is a cross-sectional view taken along a long side direction of a liquid crystal display device according to a second embodiment.

As shown in FIG. 5, the frame 118 according to the present embodiment is formed to directly support a liquid crystal panel 111 and a diffusion sheet 122. In association with this, in the present embodiment, the fixing member 28 (see FIG. 3 and FIG. 4) described above in the first embodiment is omitted. A front side surface of the frame 118 supports an outer peripheral end portion of the liquid crystal panel 111 from a back side. A diffusion sheet support portion 30 protruded from an inner peripheral surface in a stepped manner is arranged in the frame 118. With the diffusion sheet support portion 30, the outer peripheral end portion of the diffusion sheet 122 can be supported from the back side. In this way, in the present embodiment, the frame 118 serves as "a support member" that supports the liquid crystal panel 111 and the diffusion sheet 122 to secure a low refraction index layer 129 between the liquid crystal panel 111 and the diffusion sheet 122, and the Fresnel lens sheet 121.

Third Embodiment

A third embodiment of the present technology will be described with reference to FIG. 6 or FIG. 7. In the third embodiment, a configuration in which a diffusion sheet 222 is modified from that of the second embodiment described above, is described. An overlapped description relating to a configuration, a function and an effect similar to those of the second embodiment, is omitted.

Figure 6:
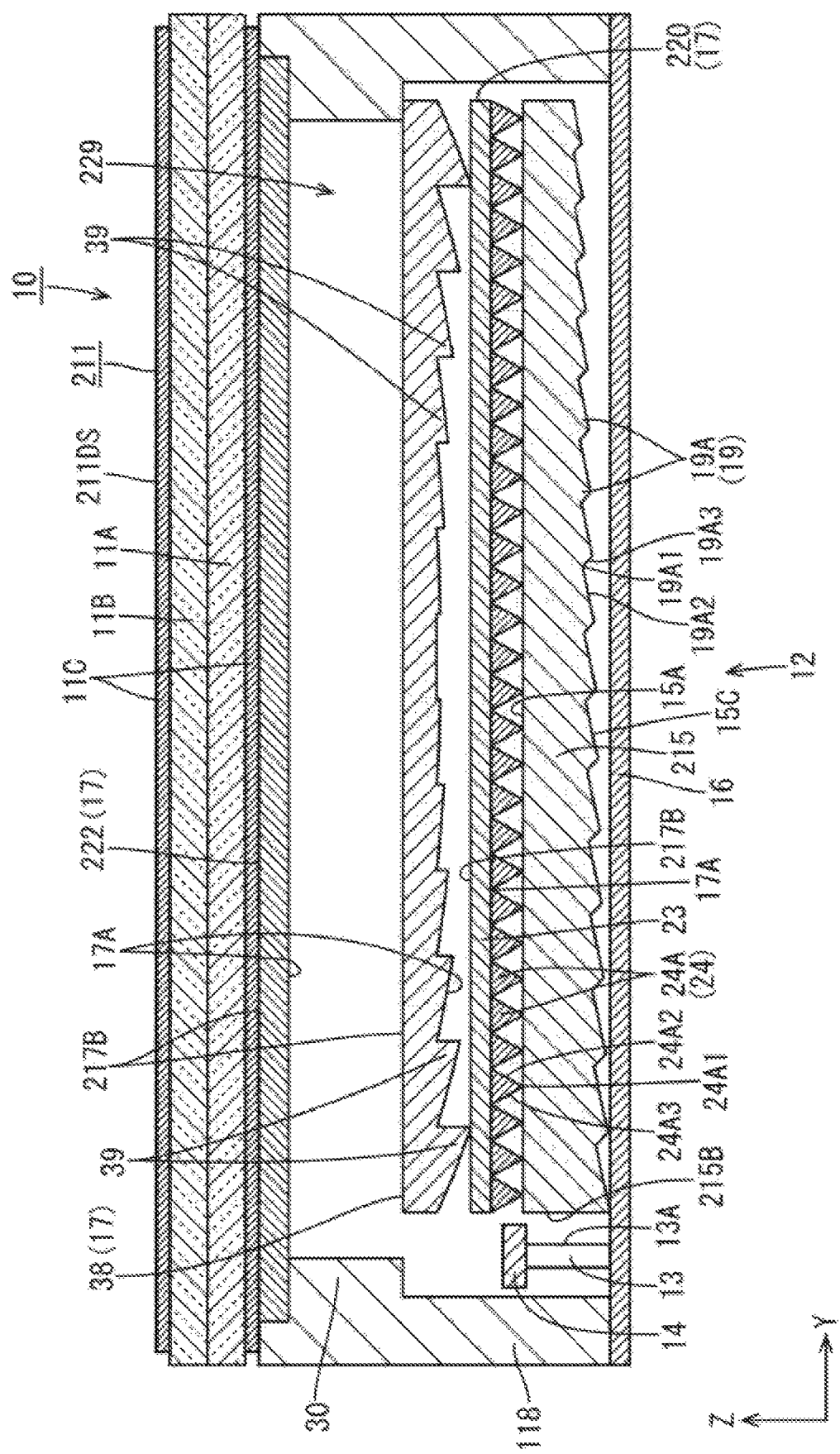
FIG. 6 is a cross-sectional view taken along a long side direction of a liquid crystal display device according to a third embodiment.
Figure 7:
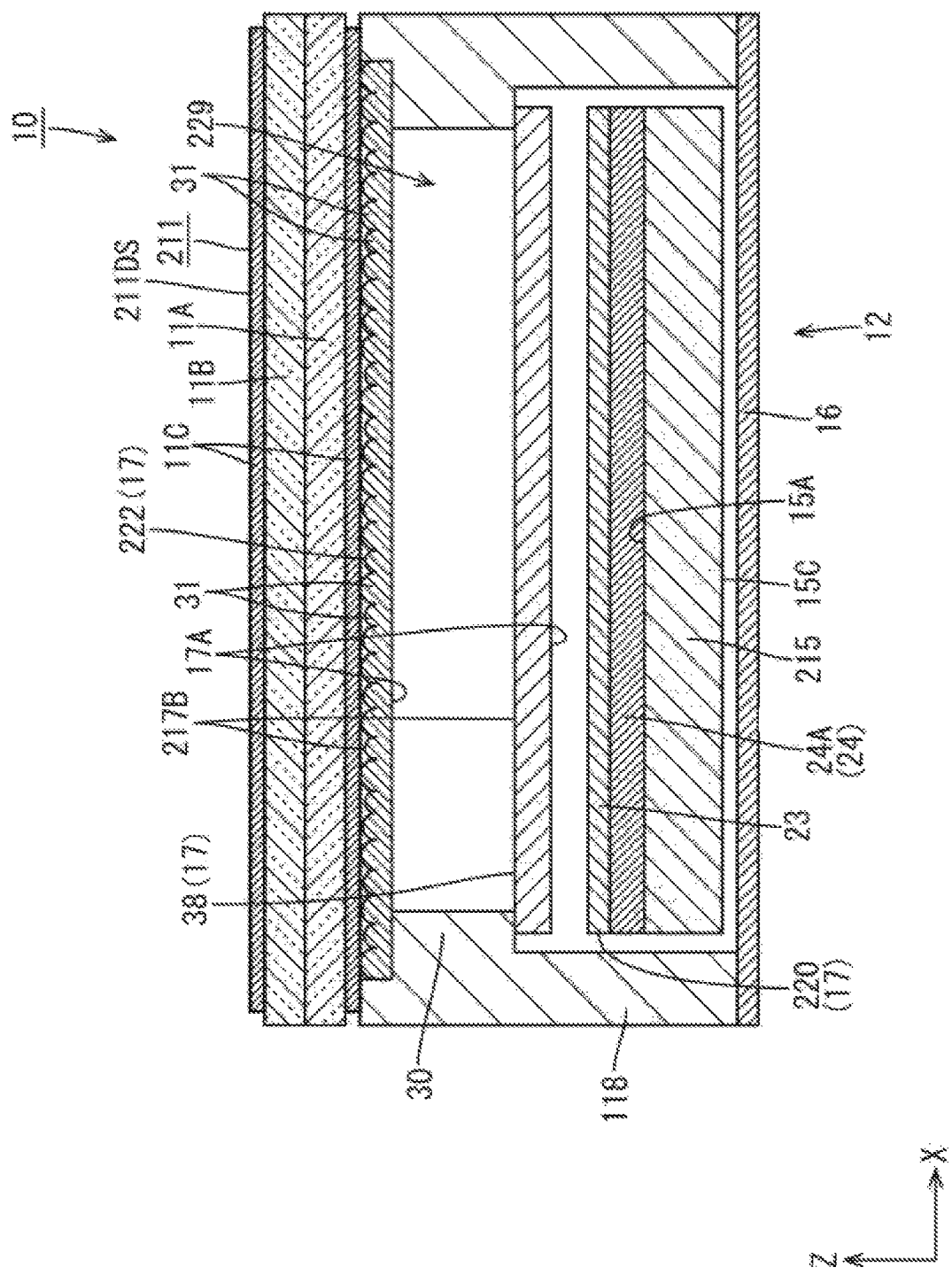
FIG. 7 is a cross-sectional view taken along a short side direction of the liquid crystal display device.

As shown in FIG. 6 and FIG. 7, in the diffusion sheet 222 according to the present embodiment, a diffusion layer 227 is arranged at a side of a light exit surface 217B. The diffusion layer 227 corresponds to "an anisotropic diffusion layer" that imparts an anisotropic diffusion effect to light. Specifically, the diffusion layer 227 serving as the anisotropic diffusion layer has a configuration in which cylindrical lenses 31, each of which is formed in a substantially half cylindrical shape extended along the Y axis direction, namely a normal direction of a light incident end surface 215B, are aligned along the X axis direction (an orthogonal direction orthogonal to the normal direction of the light incident end surface 215B) so as to be substantially parallel to an extension direction, namely a longitudinal direction, of the cylindrical lens 31. The cylindrical lens 31 is formed in a substantially semicircular shape in section (semi-cylindrical shape) taken along the extension direction, namely an aligned direction orthogonal to the Y axis direction, namely the X axis direction. The cylindrical lens 31 can selectively refract and diffuse the light in the aligned direction by a curve surface having an arc shape. Accordingly, the diffusion layer 227 according to the present embodiment is formed to impart an anisotropic diffusion effect to light such that a light diffusion degree in the X axis direction, which is the aligned direction of the cylindrical lenses 31, is made larger, and the light diffusion degree in the Y axis direction, which is the extension direction of each of the cylindrical lenses 31, is made smaller. In the diffusion sheet 222, the X axis direction with the high light diffusion degree due to the diffusion layer 227 serves as a high diffusion direction, and the Y axis direction with the low light diffusion degree due to the diffusion layer 227 because the diffusion effect is hardly imparted, serves as a low diffusion direction. In this way, the diffusion sheet 222 has an anisotropic diffusion function. With this, the display failure can be hardly recognized without deteriorating the utilization efficiency of the light. In addition, the cylindrical lenses 31 aligned along the X axis direction are formed different in a height size to each other at random, namely formed not to be in a periodic manner. With this, moire, namely an interference fringe, is hardly generated in the image displayed on a display surface 211DS of a liquid crystal panel 211. In the cylindrical lens 31 forming the diffusion layer 227, a diffusion angle in the Y axis direction serving as the low diffusion direction is preferably set within an range of, for example, from 0.01 degrees to 3 degrees, and more preferably from 0.01 degrees to 1 degree. "The diffusion angle" described above denotes a whole angle when a relative illuminance of the light is 0.5 or more, as the relative illuminance of the light in which the incident angle is 0 degree and the exit angle is 0 degree against the curve surface of the cylindrical lens 31, is set to 1. In the present embodiment, a linear Fresnel lens sheet 38 is adopted as "an optical member" instead of "the Fresnel lens sheet" described in the first and the second embodiments. The linear Fresnel lens sheet 38 has a linear Fresnel lens 39 as "a light refraction portion". The linear Fresnel lens 39 is formed such that a curvature in the Y axis direction is similar to that of "the Fresnel lens sheet" described in the first and the second embodiments, while a curvature in the X axis direction is not set.

According to the present embodiment described above, the diffusion sheet 222 interposed between the liquid crystal panel 211 and the low refraction index layer 229 so as to diffuse the light emitted from the light exit surface 217B of the linear Fresnel lens sheet 38 is arranged, and the diffusion sheet 222 has the diffusion layer (anisotropic diffusion layer) 227 that imparts the anisotropic diffusion effect to the light such that the light diffusion degree in the normal direction is made low and the light diffusion degree in the orthogonal direction is made high. With such a configuration, the anisotropic diffusion effect is imparted to the light directed to the liquid crystal panel 211 from the low refraction index layer 229 by the diffusion sheet 222. In the diffusion sheet 222, the low diffusion effect is imparted to the light in the normal direction of the light incident end surface 215B of the light guide plate 215 by the diffusion layer 227, and the high diffusion effect is imparted to the light in the orthogonal direction orthogonal to the normal direction. That is, the diffusion sheet 222 imparts the low diffusion effect to the light to which the high light condensing effect is imparted by the anisotropic light condensing sheet 220, and imparts the high diffusion effect to the light to which the low light condensing effect is imparted by the anisotropic light condensing sheet 220, respectively. With this, the display failure can be hardly recognized without deteriorating the utilization efficiency of the light.

Fourth Embodiment

A fourth embodiment of the present technology will be described with reference to FIG. 8. In the fourth embodiment, a configuration in which a diffusion sheet 322 is modified from that of the first embodiment described above, is described. An overlapped description relating to a configuration, a function and an effect similar to those of the first embodiment, is omitted.

Figure 8:
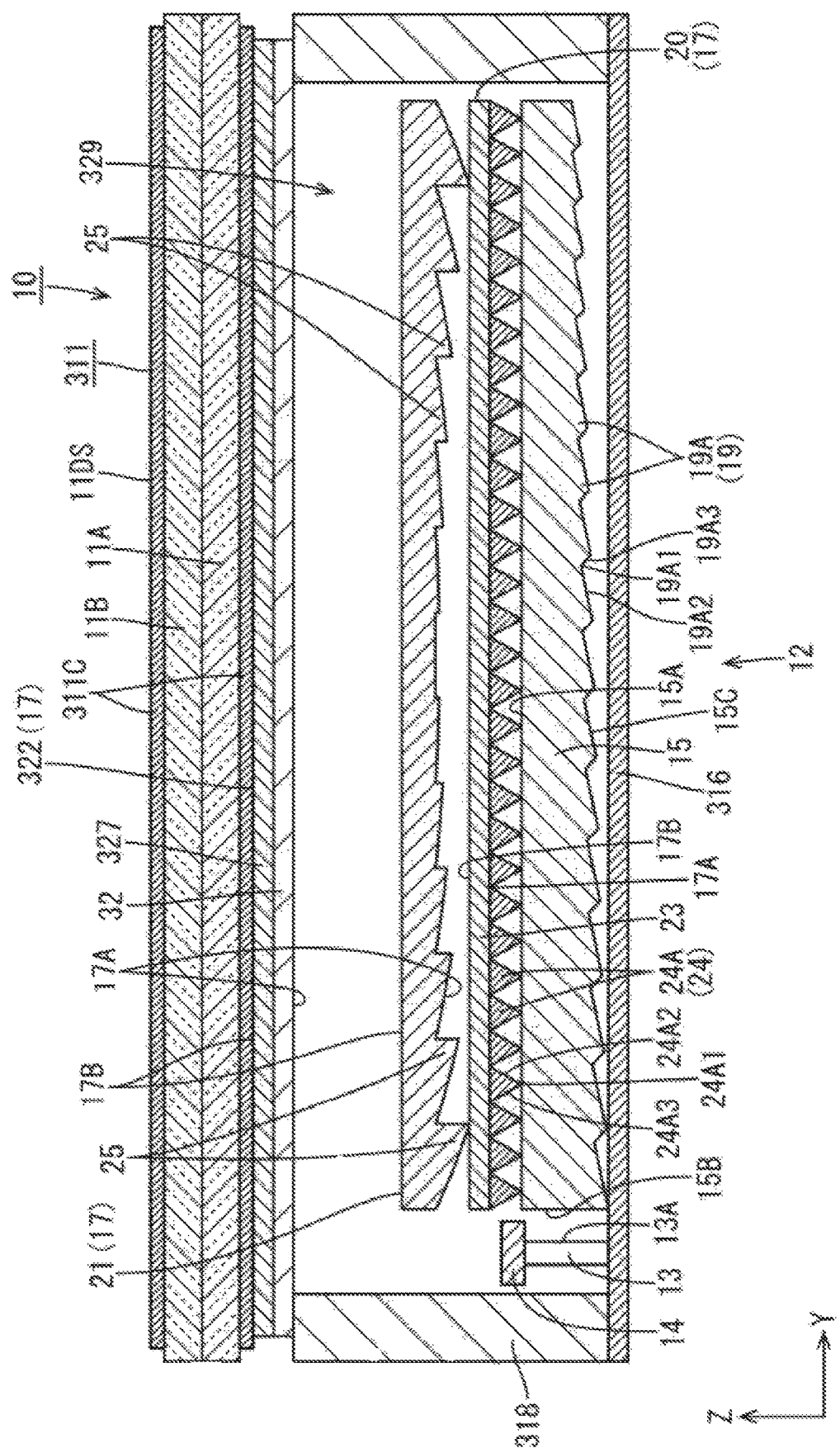
FIG. 8 is a cross-sectional view taken along a long side direction of a liquid crystal display device according to a fourth embodiment.

As shown in FIG. 8, the diffusion sheet 322 according to the present embodiment is provided with a polarizing reflection layer 32 that polarizes and reflects light, in addition to a diffusion layer 327. The polarizing reflection layer 32 has a multi-layer structure in which, for example, layers having different refraction indexes are laminated to each other, so as to transmit a p-wave included in the light and to reflect an s-wave to a back side. The s-wave reflected by the polarizing reflection layer 32 is reflected again to a front side by a reflection sheet 316 or the like, and at that time, the polarized into the s-wave and the p-wave. In this way, the polarizing reflection layer 32 can reuse the s-wave, which is basically absorbed by a polarizing plate 311C of a liquid crystal panel 311, by reflecting the s-wave to the back side, namely a side of the reflection sheet 316, and thereby the utilization efficiency of the light and luminance can be improved. As such polarizing reflection layer 32, a product named "APF" produced by Sumitomo 3M Limited may be used. On the other hand, the diffusion layer 327 is arranged on a surface at the front side of the polarizing reflection layer 32 described above. The diffusion layer 327 has a configuration in which many diffusion particles are dispersed and compounded into an adhesive material. Accordingly, the diffusion sheet 322 is fixed to the polarizing plate 311C arranged at the back side of the liquid crystal panel 311 by the adhesive material included in the diffusion layer 327. That is, the diffusion layer 327 works also as "a fixing layer" for fixing the diffusion sheet 322 to the liquid crystal panel 311. With this, in the present embodiment, the fixing member 28 (see FIG. 3 and FIG. 4) described in the first embodiment described above is omitted, and therefore the diffusion sheet 322 fixed to the liquid crystal panel 311 is supported from the back side by a frame 318.

As described above, according to the present embodiment, the diffusion sheet 322 is provided with at least the diffusion layer 327 that diffuses the light, and the polarizing reflection layer 32 that polarizes and reflects the light. With such a configuration, the display failure can be hardly recognized by diffusing the light by using the diffusion layer 327. In addition, the utilization efficiency of the light can be improved by polarizing and reflecting the light by using the polarizing reflection layer 32.

The diffusion sheet 322 is fixed to the liquid crystal panel 311 via the diffusion layer 327 serving as the fixing layer. With such a configuration, a specialized retaining mechanism (fixing member 28) for retaining the diffusion sheet 322 at a position between a low refraction index layer 329 and the liquid crystal panel 311 is not needed.

Fifth Embodiment

A fifth embodiment of the present technology will be described with reference to FIG. 9. In the fifth embodiment, a configuration in which a diffusion sheet 422 is modified from that of the first embodiment described above, is described. An overlapped description relating to a configuration, a function and an effect similar to those of the first embodiment, is omitted.

Figure 9:
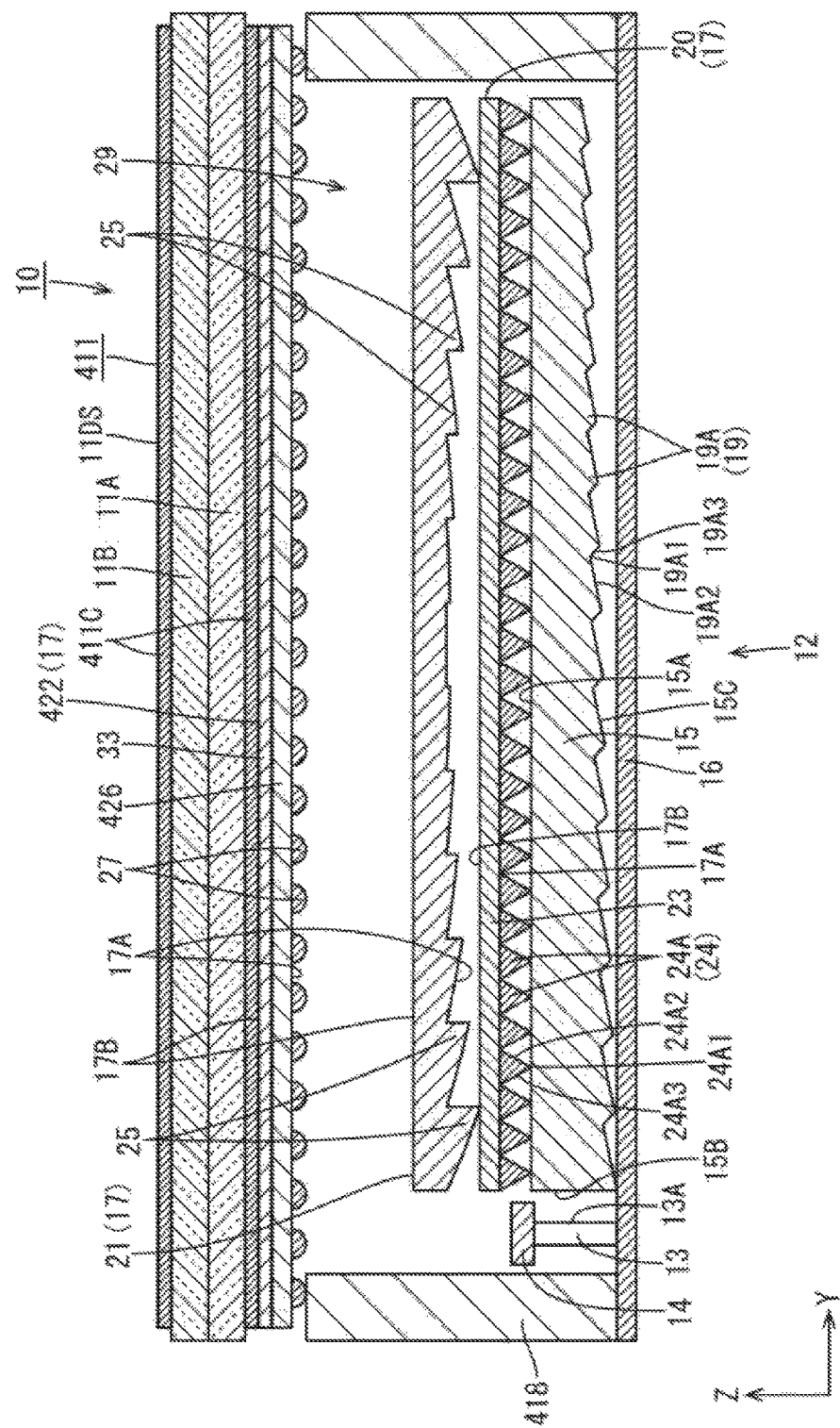
FIG. 9 is a cross-sectional view taken along a long side direction of a liquid crystal display device according to a fifth embodiment.

As shown in FIG. 9, the diffusion sheet 422 according to the present embodiment has a fixing layer 33 on a surface at a front side of a base material 426. The fixing layer 33 is formed by an adhesive material so as to fix the diffusion sheet 422 to a polarizing plate 411C arranged at a back side of a liquid crystal panel 411. With this, in the present embodiment, the fixing member 28 (see FIG. 3 and FIG. 4) described in the first embodiment described above is omitted, and therefore the diffusion sheet 422 fixed to the liquid crystal panel 411 is supported from a back side by a frame 418.

Sixth Embodiment

A sixth embodiment of the present technology will be described with reference to FIG. 10. In the sixth embodiment, a configuration in which a diffusion sheet 522 is modified from that of the fifth embodiment described above, is described. An overlapped description relating to a configuration, a function and an effect similar to those of the fifth embodiment, is omitted.

Figure 10:
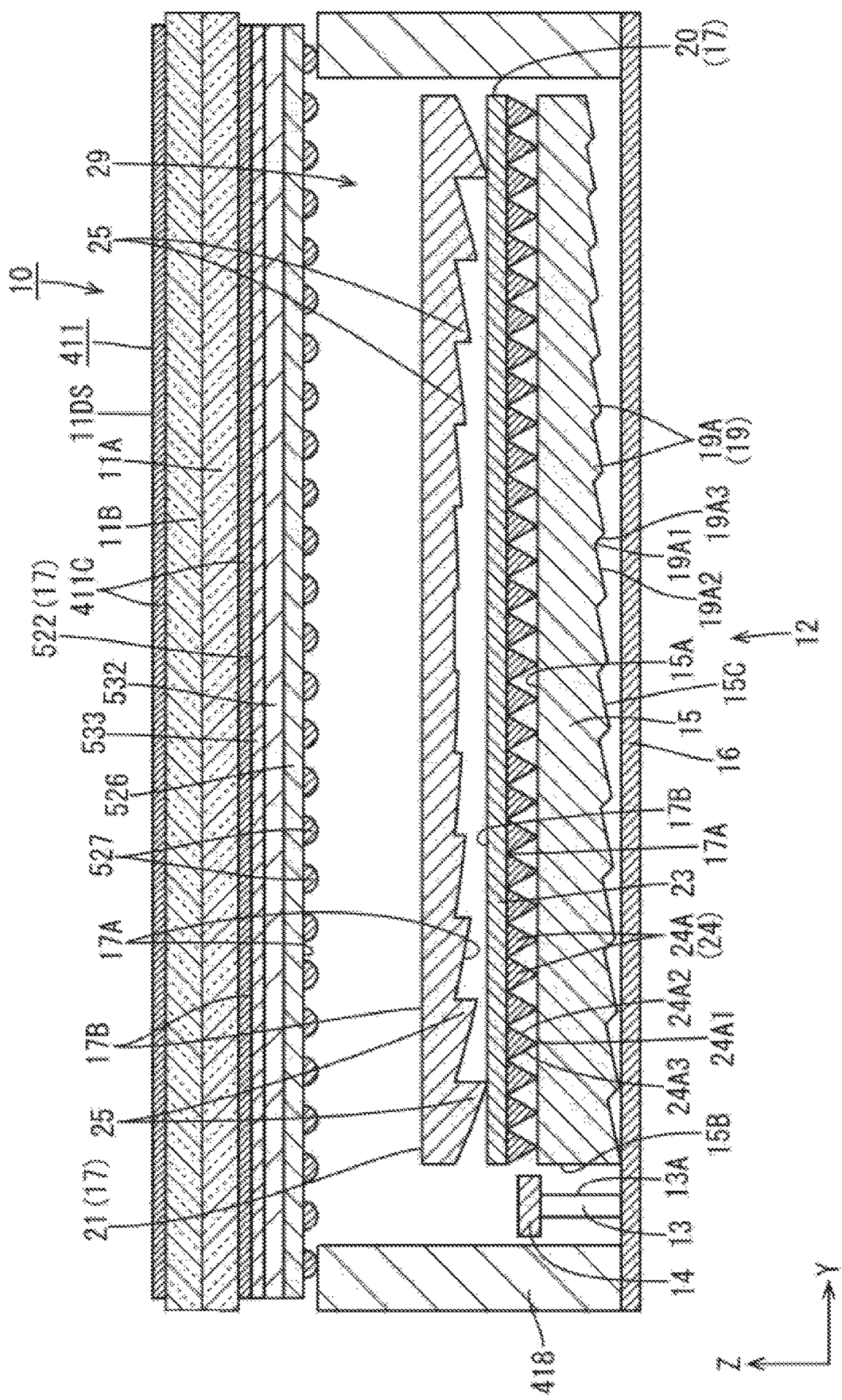
FIG. 10 is a cross-sectional view taken along a long side direction of a liquid crystal display device according to a sixth embodiment.

As shown in FIG. 10, the diffusion sheet 522 according to the present embodiment is provided with a polarizing reflection layer 532 that polarizes and reflects light, in addition to a base material 526, a diffusion layer 527, and a fixing layer 533. The polarizing reflection layer 532 is the same as the polarizing reflection layer 432 described in the fourth embodiment described above, and therefore a specific description thereof is omitted. The polarizing reflection layer 532 is arranged to be laminated on the base material 526 at a front side. The fixing layer 533 is arranged on a surface at a front side of the polarizing reflection layer 532.

Seventh Embodiment

A seventh embodiment of the present technology will be described with reference to FIG. 11 and FIG. 12. In the seventh embodiment, a configuration in which an anisotropic light condensing sheet 620 is modified from that of the first embodiment described above, is described. An overlapped description relating to a configuration, a function and an effect similar to those of the first embodiment, is omitted.

Figure 11:
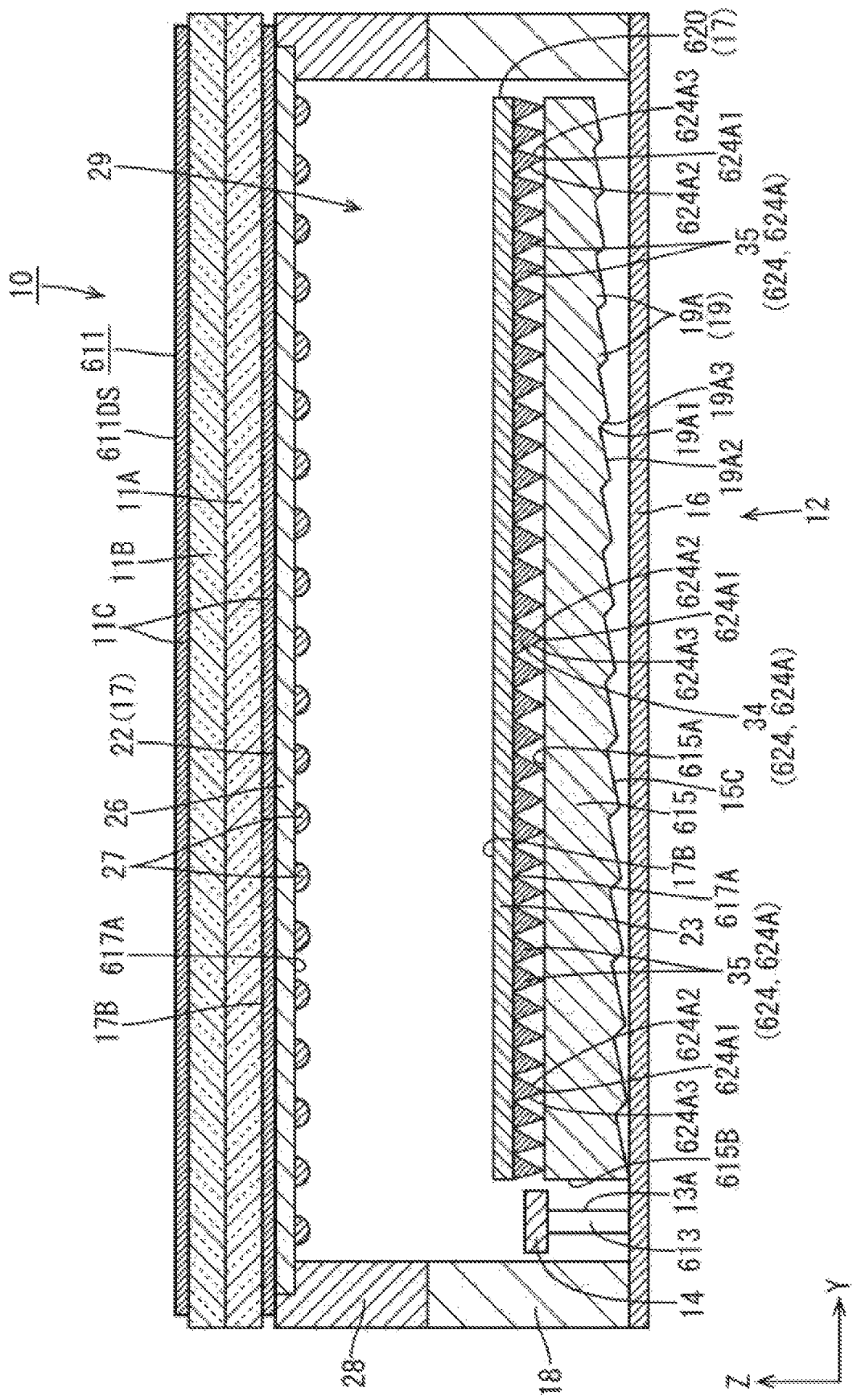
FIG. 11 is a cross-sectional view taken along a long side direction of a liquid crystal display device according to a seventh embodiment.

As shown in FIG. 11, prisms 624A, which form an anisotropic light condensing layer 624 installed in the anisotropic light condensing sheet 620 according to the present embodiment, include an apex part eccentric prism 35 having an apex part 624A1 eccentric in the Y axis direction, and an apex part non-eccentric prism 34 having an apex part 624A1 non-eccentric in the Y axis direction. The anisotropic light condensing sheet 620 corresponds to "an optical member". The anisotropic light condensing layer 624 corresponds to "a light refraction portion". Among those, as shown in FIG. 12, the apex part non-eccentric prisms 34 are arranged at a center side of a light incident surface 617A in the Y axis direction. The apex part non-eccentric prism 34 is formed in a substantially isosceles triangle in section, and the apex part 624A1 thereof is not eccentric in the X axis direction, so that each of inclined surfaces 624A2 and 624A3 forming a pair is inclined at the same angle against the Y axis direction. In the apex part non-eccentric prism 34, areas of the inclined surfaces 624A2 and 624A3, which form a pair, are equal to each other. In FIG. 12, an illustration of a liquid crystal panel is omitted.

Figure 12:
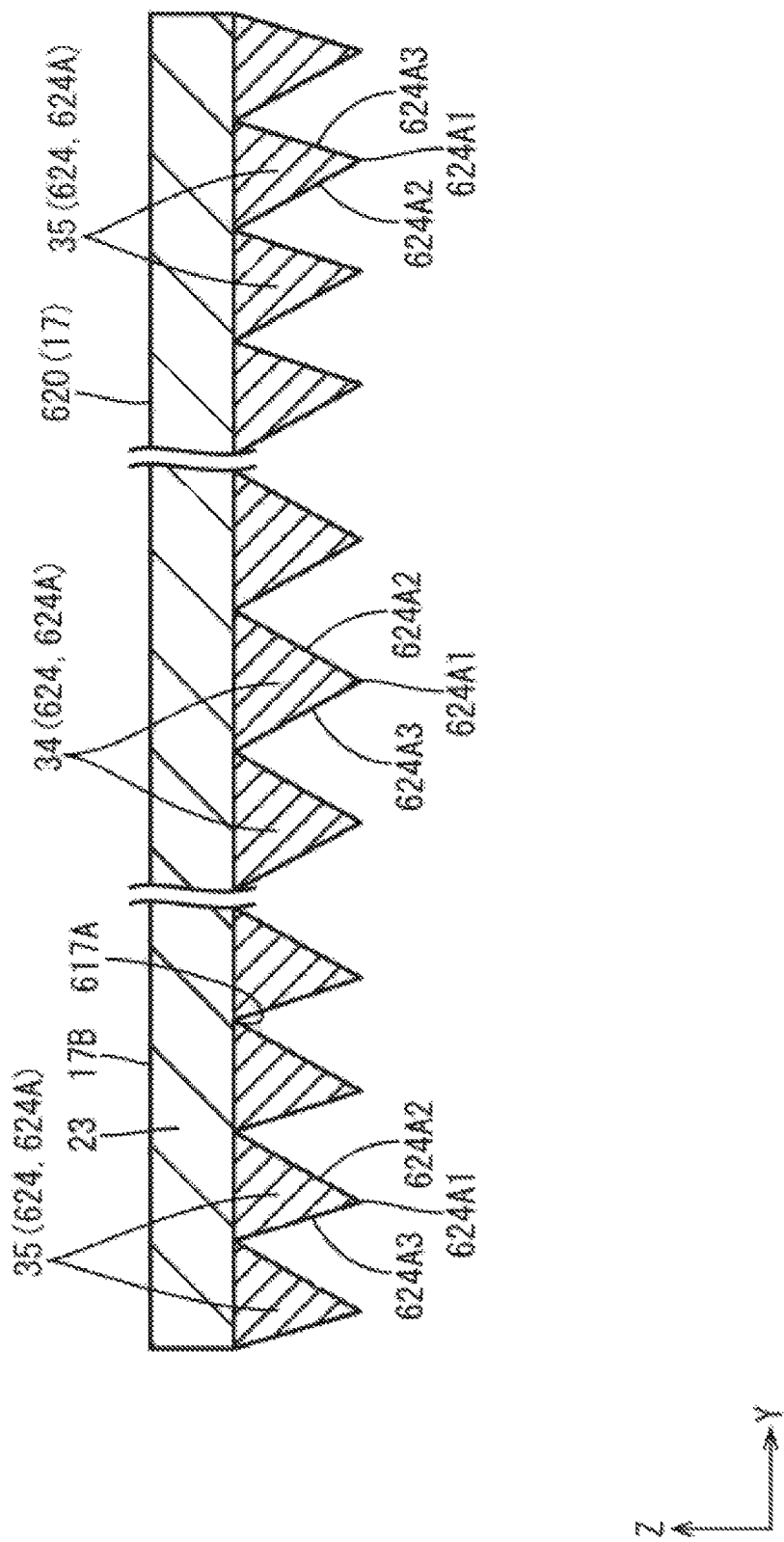
FIG. 12 is an enlarged cross-sectional view of a prism in an anisotropic light condensing layer of an anisotropic prism sheet.

As shown in FIG. 12, the apex part eccentric prism 35 is arranged at an end side on a light incident surface 617A in the Y axis direction with respect to the apex part non-eccentric prism 34, and the apex part 624A1 thereof is eccentric to the end side of the light incident surface 617A in the Y axis direction. With such a configuration, the apex part eccentric prism 35 has a second inclined surface 624A3 arranged at the end side in the Y axis direction, namely a side opposite to a side of the apex part non-eccentric prism 34, having an inclined angle against the Y axis direction larger than that of a first inclined surface 624A2 arranged at a center side (a side of the apex part non-eccentric prism 34) in the Y axis direction, among a pair of the inclined surfaces 624A2 and 624A3. A difference between the inclined angles of the first inclined surface 624A2 and the second inclined surface 624A3 against the Y axis direction in the apex part eccentric prism 35 is different in accordance with a position in the Y axis direction of the apex part eccentric prism 35 on the light incident surface 617A. The difference becomes asymptotically larger as the position in the Y axis direction is closer to the end side from the center side. An area of the second inclined surface 624A3 of the apex part eccentric prism 35 is smaller than an area of the first inclined surface 624A2. The difference between the areas of the first inclined surface 624A2 and the second inclined surface 624A3 becomes asymptotically larger as the position in the X direction of the apex part eccentric prism 35 on the light incident surface 617A is closer to the end side from the center side. In the apex part eccentric prism 35 located at a side of an LED 613 in the Y axis direction, namely a left side in FIG. 11 and FIG. 12, with respect to the apex part non-eccentric prism 34 among the apex part eccentric prisms 35, the first inclined surface 624A2 is arranged at a side opposite to the side of the LED 613 in the Y axis direction, and the second inclined surface 624A3 is arranged at the side of the LED 613 in the Y axis direction. Contrastingly, in the apex part eccentric prism 35 located at a side (a right side in FIG. 11 and FIG. 12) opposite to the side of the LED 613 in the Y axis direction with respect to the apex part non-eccentric prism 34, the first inclined surface 624A2 is arranged at the side of the LED 613 in the Y axis direction, and the second inclined surface 624A3 is arranged at the side opposite to the side of the LED 613 in the Y axis direction.

As shown in FIG. 11 and FIG. 12, the apex part eccentric prism 35 is formed to impart a refraction effect to light on the inclined surfaces 624A2 and 624A3 arranged at a side opposite to the side of the LED 613 in the Y axis direction with respect to the apex part 624A1. Specifically, among the apex part eccentric prisms 35, the apex part eccentric prism 35 located at the side of the LED 613 in the Y axis direction with respect to the apex part non-eccentric prism 34 is formed to impart the refraction effect to the light on the first inclined surface 624A2 arranged at the side opposite to the side of the LED 613 in the Y axis direction with respect to the apex part 624A1, and since the inclined angle of the first inclined surface 624A2 against the Y axis direction is smaller than the inclined angle of the second inclined surface 624A3 against the Y axis direction, the first inclined surface 624A2 imparts the refraction effect to the light to be oriented to the center side of a display surface 611DS of a liquid crystal panel 611 in the Y axis direction. On the other hand, the apex part eccentric prism 35 located at the side opposite to the side of the LED 613 in the Y axis direction with respect to the apex part non-eccentric prism 34 is formed to impart the refraction effect to the light on the second inclined surface 624A3 arranged at the side opposite to the side of the LED 613 in the Y axis direction with respect to the apex part 624A1, and since the inclined angle of the second inclined surface 624A3 against the Y axis direction is larger than the inclined angle of the first inclined surface 624A2 against the Y axis direction, the second inclined surface 624A3 imparts the refraction effect to the light to be oriented to the center side of the display surface 611DS of the liquid crystal panel 611 in the Y axis direction.

As described above, the apex part eccentric prism 35 has the apex part 624A1 eccentric to be close to an end of the light incident surface 617A in the Y axis direction, so that the apex part eccentric prism 35 can impart an anisotropic refraction effect to the emitted light to be oriented to the center side of the display surface 611DS of the liquid crystal panel 611 in the Y axis direction. With this, the utilization efficiency of the light can be further improved. In addition to the anisotropic refraction effect described above, the anisotropic light condensing layer 624 can impart the anisotropic light condensing effect similar to that of the first embodiment described above, to the emitted light. That is, the anisotropic light condensing sheet 620 has a function of "the Fresnel lens sheet" (see FIG. 3 and FIG. 4) described in the first embodiment, and therefore "the Fresnel lens sheet" can be omitted. With this, the number of components can be reduced, and this configuration is suitable for achieving a low cost.

As described above, according to the present embodiment, a light guide plate 615 including a light incident end surface 615B, which is at least a part of an outer peripheral end surface of the light guide plate 615, on which the light emitted from the LED 613 is incident, and a light exit plate surface 615A, which is one of a pair of plate surfaces of the light guide plate 615 and is formed to emit the light, is provided, and the light guide plate 615 is arranged to be overlapped with the anisotropic light condensing sheet (optical member) 620 at a side opposite to a side of the liquid crystal panel 611. The anisotropic light condensing sheet 620 has the light incident surface 617A facing the light exit plate surface 615A of the light guide plate 615. The anisotropic light condensing layer (light refraction portion) 624 is arranged on the light incident surface 617A. The anisotropic light condensing layer 624 is formed by the prisms 624A aligned along the normal direction. Each of the prisms 624A is extended in an orthogonal direction orthogonal to a normal direction of the light incident end surface 615B and has the apex part 624A1 and a pair of the inclined surfaces 624A2 and 624A3 interposing the apex part 624A1. The prisms 624A includes at least the apex part eccentric prism 35 in which the apex part 624A1 arranged at the end side of the light incident surface 617A in the normal direction is eccentric to be close to the end of the light incident surface 617A in the normal direction. With such a configuration, the prisms 624A aligned along the normal direction, each of which is extended in the orthogonal direction orthogonal to the normal direction of the light incident end surface 615B on the light incident surface 617A of the anisotropic light condensing sheet 620, imparts the refraction effect to the light mainly on the inclined surfaces 624A2 and 624A3 at the side opposite to the side of the LED 613 in the normal direction with respect to the apex part 624A1. The light to which the refraction effect is imparted by the prism 624A, travels mainly along the normal direction of the light incident end surface 615B. That is, the high light condensing effect is imparted to the light in the normal direction of the light incident end surface 615B of the light guide plate 615, while the light condensing effect imparted to the light in the orthogonal direction orthogonal to the normal direction is low. Among the prisms 624A, the apex part eccentric prism 35 arranged at the end side in the normal direction on the light incident surface 617A of the anisotropic light condensing sheet 620 has the apex part 624A1 eccentric to be close to the end of the light incident surface 617A in the normal direction, so that the apex part eccentric prism 35 can impart the anisotropic refraction effect to the emitted light to be oriented to the center side of the liquid crystal panel 611 in the normal direction. In this way, the high light condensing effect is selectively imparted to the emitted light of the anisotropic light condensing sheet 620 in the normal direction of the light incident end surface 615B of the light guide plate 615, and the anisotropic refraction effect is imparted to the light to be oriented to the center side of the display surface 611DS of the liquid crystal panel 611, so that the utilization efficiency of the light can be further improved. In addition, since the anisotropic light condensing sheet 620 has both of an anisotropic light condensing function and an anisotropic light refraction function, the number of the components can be reduced, and this configuration is suitable for achieving a low cost.

Eighth Embodiment

An eighth embodiment of the present technology will be described with reference to FIG. 13. In the eighth embodiment, a configuration in which a low refraction index layer 729 is modified from that of the first embodiment described above, is described. An overlapped description relating to a configuration, a function and an effect similar to those of the first embodiment, is omitted.

Figure 13:
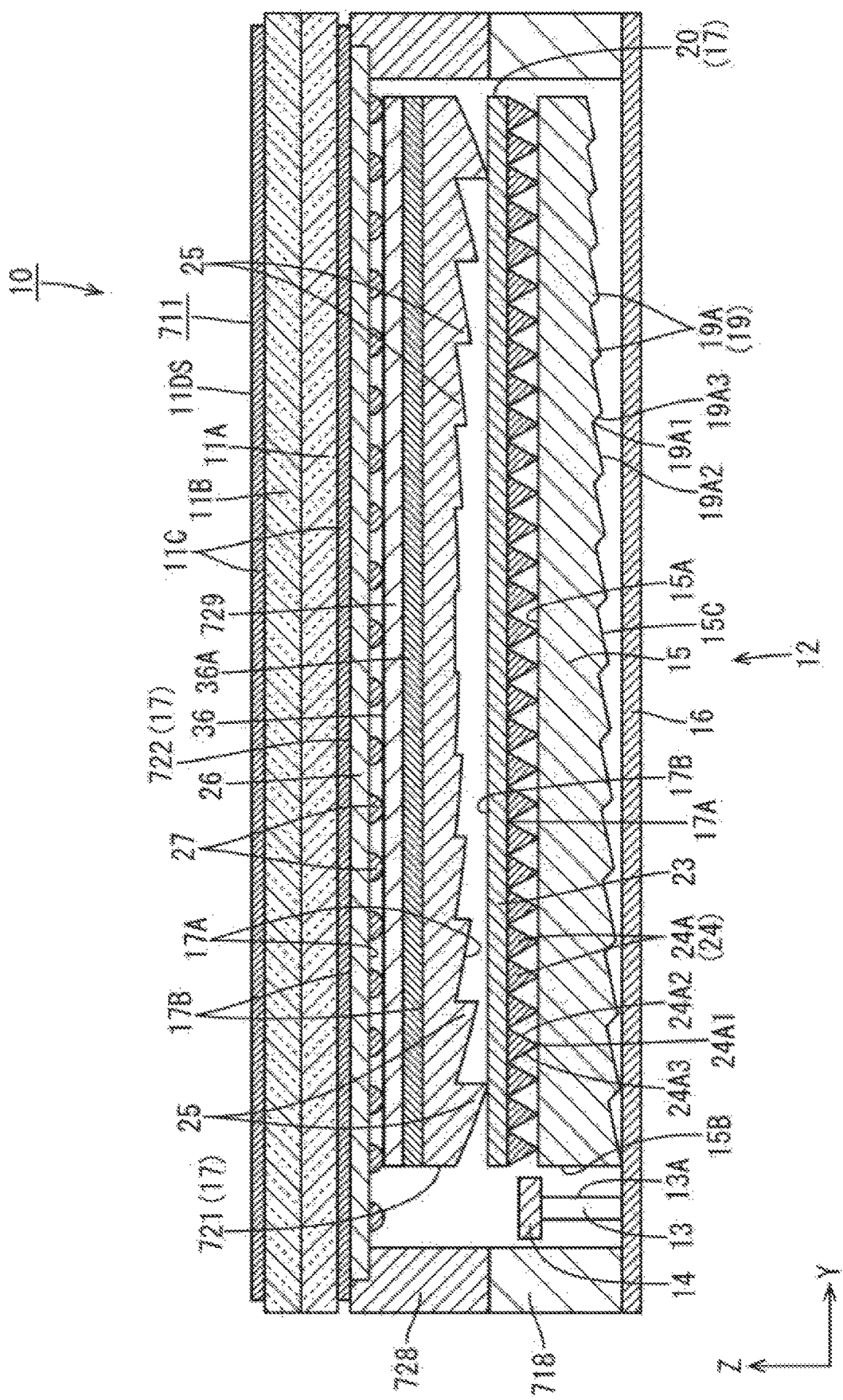
FIG. 13 is a cross-sectional view taken along a long side direction of a liquid crystal display device according to an eighth embodiment.

As shown in FIG. 13, the low refraction index layer 729 according to the present embodiment is arranged on a light transmissive film 36 having a light transmissive property interposed between a liquid crystal panel 711 and a Fresnel lens sheet 721. The light transmissive film 36 is formed by a base material 36A, and the low refraction index layer 729 laminated on a surface the base material 36A at a front side. The base material 36A is formed of, for example, PET, or the like, and a refraction index thereof is set in a range of from 1.57 to 1.58. While, the low refraction index layer 729 is formed by a resin layer formed of, for example, a silicon resin or the like, and a refraction index thereof is set in a range of from 1.4 to 1.43. Accordingly, the low refraction index layer 729 has the refraction index lower than the refraction index (from 1.5 to 1.6) of the Fresnel lens sheet 721. The light transmissive film 36 is arranged to be laminated on the Fresnel lens sheet 721 at a front side, and the light transmissive film 36 is not supported by a frame 718. Accordingly, it is not necessary to support a diffusion sheet 722 by using a fixing member 728, compared to the configuration in which the low refraction index layer is formed as an air layer as described in the first embodiment.

As described above, according to the present embodiment, the low refraction index layer 729 is formed as a resin layer formed of a synthetic resin material. With such a configuration, the liquid crystal panel 711, the low refraction index layer 729 and the Fresnel lens sheet 721 can be arranged to be directly laminated. Accordingly, compared to a configuration in which the low refraction index layer is formed as an air layer, a specific structure for securing the low refraction index layer is not needed.

Ninth Embodiment

A ninth embodiment of the present technology will be described with reference to FIG. 14. In the ninth embodiment, a configuration in which a low refraction index layer 829 is modified from that of the first embodiment described above, is described. An overlapped description relating to a configuration, a function and an effect similar to those of the first embodiment, is omitted.

Figure 14:
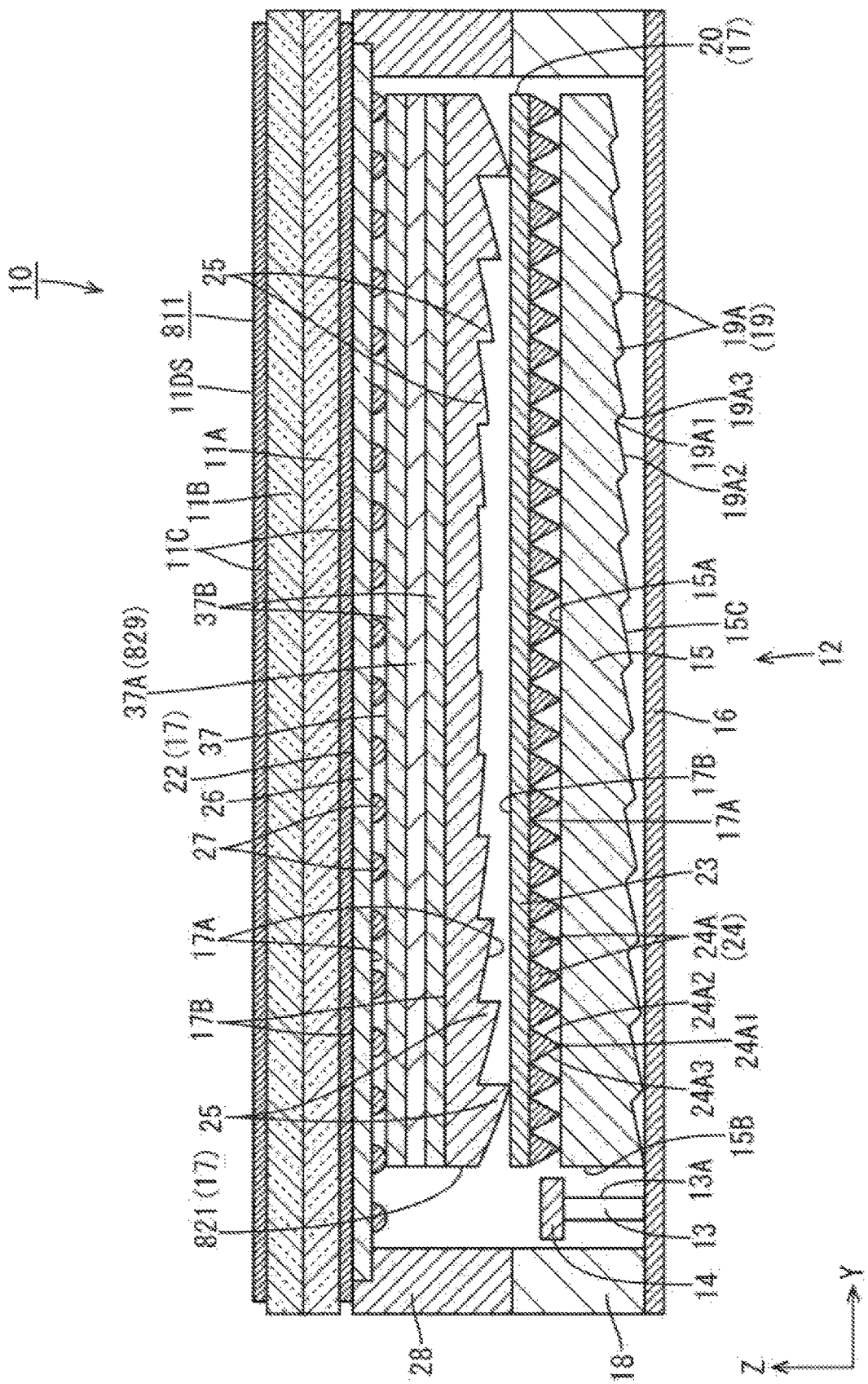
FIG. 14 is a cross-sectional view taken along a long side direction of a liquid crystal display device according to a ninth embodiment.

As shown in FIG. 14, the low refraction index layer 829 according to the present embodiment is arranged in a reflective polarization sheet 37 interposed between a liquid crystal panel 811 and a Fresnel lens sheet 821. The reflective polarization sheet 37 is formed by a polarizing reflection layer 37A that polarizes and reflects light, and a pair of diffusion layers 37B that interposes the polarizing reflection layer 37A from a front side and a back side thereof. The polarizing reflection layer 37A is formed as the low refraction index layer 829. The polarizing reflection layer 37A has a multi-layer structure in which, for example, layers having different refraction indexes to each other, namely a high refraction index layer and a low refraction index layer, are alternately laminated. The polarizing reflection layer 37A is formed to transmit a p-wave included in the light and to reflect an s-wave to the back side. The polarizing reflection layer 37A is the same as the polarizing reflection layer 32 described in the fourth embodiment, and therefore the description relating to the function, the effect and the like thereof is omitted. In the polarizing reflection layer 37A, the high refraction index layer has a refraction index larger than a refraction index (from 1.5 to 1.6) of the Fresnel lens sheet 821 in order to obtain polarizing reflection performance. While, the low refraction index layer has a refraction index lower than the refraction index of the Fresnel lens sheet 821. Each of the diffusion layers 37B forming a pair is formed of a synthetic resin material such as PC, and emboss processing is applied to a plate surface at a side opposite to a side of the polarizing reflection layer 37A in order to impart a diffusion effect to light. The Haze value of a pair of the diffusion layers 37B is preferably set to 50% or less, and more preferably set to 30% or less.

As described above, according to the present embodiment, the resin layer forming the low refraction index layer 829 includes the polarizing reflection layer 37A that polarizes and reflects light. With such a configuration, the polarizing reflection layer 37A included in the resin layer polarizes and reflects the light, so that the utilization efficiency of the light can be further improved.

Other Embodiments

The present technology is not limited to the embodiments described by the description and the drawings described above, and therefore, for example, the following embodiments are also encompassed in the subject matter.

(1) Other than each embodiment described above, the specific value of the refraction index of the low refraction index layer can be changed as needed. In such a case, the refraction index of the low refraction index layer is preferably set in a range of from 1 to 1.6, more preferably set in a range of from 1 to 1.5, and further more preferably set in a range of from 1 to 1.4; however the value of the refraction index is not necessarily limited to the ranges.

(2) Other than each embodiment described above, the specific value of the Haze value of the low refraction index layer can be changed as needed. In such a case, the Haze value of the low refraction index layer is preferably set in a range of from 0% to 50%, and more preferably set in a range of from 0% to 30%; however, the Haze value is not necessarily limited to the ranges.

(3) Other than each embodiment described above, the specific value of the thickness of the low refraction index layer can be changed as needed. In such a case, the thickness of the low refraction index layer is preferably set in a range of from 0.2 mm to 3 mm, and more preferably set in a range of from 0.5 mm to 1.5 mm; however, the thickness is not necessarily limited to the ranges.

(4) In the third embodiment described above, the height size of the cylindrical lens of the diffusion sheet is set at random, while other than such a configuration, the cylindrical lens may be formed in, for example, a meandering shape in a random meandering manner so as to impart an anisotropic diffusion function to the diffusion sheet. In such a case, the height size of the cylindrical lens may be set to be uniform, whereas, the height size of the cylindrical lens may be set at random.

(5) In the third embodiment described above, the cylindrical lens of the diffusion sheet has a configuration not having periodicity; however, the cylindrical lens may have a configuration having periodicity.

(6) The diffusion sheet described in each of the third, and seventh to ninth embodiments described above may be changed to any one of the diffusion sheets (the diffusion sheet fixed to the liquid crystal panel) described in the fourth to sixth embodiments.

(7) The fixing member described in the first, and seventh to ninth embodiments described above may be fixed to the frame described in the third to sixth embodiments described above.

(8) The fixing member described in the seventh to ninth embodiments may be omitted to support the liquid crystal panel and the diffusion sheet by using the frame as described in the third to sixth embodiments.

(9) In each embodiment (expect the seventh embodiment) described above, the Fresnel lens sheet is described as the optical member having the light refraction portion; however a linear Fresnel lens sheet, a spherical lens sheet or the like may be adopted instead of the Fresnel lens sheet.

(10) In each embodiment described above, the one-sided light incident type backlight device in which the light is incident on the light guide plate from one side is described; however a both-sided light incident type backlight device in which the light is incident on the light guide plate form both sides may be adopted.

(11) In the drawing of each of the embodiments described above, the size of each of the prisms, the Fresnel lenses or the like of the anisotropic light condensing layer or the number of those components is described in a deformed manner, and therefore the actual size or the number thereof may be different from that illustrated in the drawings.

(12) In each embodiment, the side surface light emission type LED is described; however a top surface light emission type LED may be adopted as a light source.

(13) In each embodiment described above, the LED is adopted as a light source; however, a laser diode, an organic EL, or the like may be adopted as the light source instead of the LED. Further, the light source may be changed to a linear light source instead of the point light source such as the LED.

(14) In each embodiment described above, the configuration in which the light guide plate is formed in a substantially wedge shape in section, so that the thickness thereof is changed, is described; however a flat plate shape light guide plate having an uniform thickness in a whole range may be adopted. Such a configuration facilitates producing of the light guide plate compared to the wedge shape light guide plate.

(15) In each embodiment described above, the liquid crystal display device having the liquid crystal panel is exemplarily described; however the present technology can be applied to a display device having other kind of a display panel such as a PDP (plasma display panel), an organic EL panel, an EPD (micro capsule type electrophoretic display panel), a MEMS (micro electro mechanical systems) display panel and the like.

(16) In each embodiment described above, the head-mounted display is described; however, the present technology can be applied to a device that enlarges and displays an image displayed on a liquid crystal panel by using a lens, such as a head up display and a projector. Further, the present technology can be applied to a liquid crystal display device (a television receiving device, a tablet type terminal, a smartphone or the like) not having an enlarging display function.

The invention claimed is:

1. A display device comprising:
a display panel having a display surface that displays an image; and
a lighting device that supplies light to the display panel, wherein
the lighting device includes a light source, and an optical member having at least a light exit surface through which the light emitted by the light source exits toward the display surface of the display panel,
the optical member includes a light refraction portion that imparts an anisotropic refraction effect to at least light rays exiting through an edge section of the light exit surface to be oriented toward a center side of the display surface,
the display device further comprises a low refraction index layer interposed between the display panel and the optical member, the low refraction index layer having a refraction index lower than at least a refraction index of the optical member,
the light refraction portion is formed by a Fresnel lens arranged on a light incident surface of the optical member, and
the Fresnel lens has a curvature relatively larger at an outer peripheral end side of the light exit surface than at a central side of the light exit surface.

2. The display device according to claim 1, further comprising a light guide plate including a light incident end surface that is a part of an outer peripheral end surface of the light guide plate and through which the light emitted by the light source enters, and a light exit plate surface that is one of a pair of plate surfaces of the light guide plate and through which the light exits, the light guide plate being arranged to be overlapped with the optical member and arranged at a side opposite to a side of the display panel, wherein
the optical member includes a light incident surface facing the light exit plate surface of the light guide plate, and the light refraction portion is arranged on the light incident surface,
the light refraction portion includes prisms each of which extends along an orthogonal direction orthogonal to a normal direction of the light incident end surface and has an apex part and a pair of inclined surfaces interposing the apex part, the prisms being aligned along the normal direction, and
the prisms include at least an apex part eccentric prism arranged at an end side of the light incident surface in the normal direction, the apex part eccentric prism having the apex part eccentric to be close to an end of the light incident surface in the normal direction.

3. The display device according to claim 1, further comprising:
a light guide plate including the light incident end surface and a light exit plate surface, the light incident surface being at least a part of an outer peripheral end surface of the light guide plate and through which the light emitted by the light source enters, and the light exit plate surface being one of a pair of plate surfaces of the light guide plate and through which the light exits, the light guide plate being arranged to be overlapped with the optical member, and
an anisotropic light condensing member interposed between the light guide plate and the optical member, wherein
the anisotropic light condensing member includes an anisotropic light condensing layer that imparts an anisotropic light condensing effect to light such that a light condensing degree in the normal direction of the light incident end surface is made larger and a light condensing degree in an orthogonal direction orthogonal to the normal direction is made smaller.

4. The display device according to claim 3, further comprising a diffusion member interposed between the display panel and the low refraction index layer to diffuse the light exiting through the light exit surface of the optical member, wherein
the diffusion member includes an anisotropic diffusion layer that imparts an anisotropic diffusion effect to the light such that a light diffusion degree in the normal direction is made smaller and a light diffusion degree in the orthogonal direction is made larger.

5. The display device according to claim 1, further comprising a diffusion member interposed between the display panel and the low refraction index layer to diffuse the light emitted from the light exit surface of the optical member.

6. The display device according to claim 5, wherein the diffusion member includes at least a diffusion layer that diffuses light and a polarizing reflection layer that polarizes and reflects light.

7. The display device according to claim 1, further comprising a support member that supports at least the display panel from a side of the optical member.

8. The display device according to claim 1, wherein the low refraction index layer is a resin layer formed of a synthetic resin material.

9. A display device comprising:
a display panel having a display surface that displays an image;
a lighting device that supplies light to the display panel; and a light guide plate;

wherein the lighting device includes a light source, and an optical member having at least a light exit surface through which the light emitted by the light source exits toward the display surface of the display panel, the optical member includes a light refraction portion that imparts an anisotropic refraction effect to at least light rays exiting through an edge section of the light exit surface to be oriented toward a center side of the display surface, the display device further comprises a low refraction index layer interposed between the display panel and the optical member, the low refraction index layer having a refraction index lower than at least a refraction index of the optical member, the light guide plate includes a light incident end surface that is a part of an outer peripheral end surface of the light guide plate and through which the light emitted by the light source enters, and a light exit plate surface that is one of a pair of plate surfaces of the light guide plate and through which the light exits, the light guide plate being arranged to be overlapped with the optical member and arranged at a side opposite to a side of the display panel, wherein the optical member includes a light incident surface facing the light exit plate surface of the light guide plate, and the light refraction portion is arranged on the light incident surface, the light refraction portion includes prisms each of which extends along an orthogonal direction orthogonal to a normal direction of the light incident end surface and has an apex part and a pair of inclined surfaces interposing the apex part, the prisms being aligned along the normal direction, and the prisms include at least an apex part eccentric prism arranged at an end side of the light incident surface in the normal direction, the apex part eccentric prism having the apex part eccentric to be close to an end of the light incident surface in the normal direction.

10. The display device according to claim 9, further comprising:

a light guide plate including the light incident end surface and a light exit plate surface, the light incident surface being at least a part of an outer peripheral end surface of the light guide plate and through which the light emitted by the light source enters, and the light exit plate surface being one of a pair of plate surfaces of the light guide plate and through which the light exits, the light guide plate being arranged to be overlapped with the optical member, and an anisotropic light condensing member interposed between the light guide plate and the optical member, wherein the anisotropic light condensing member includes an anisotropic light condensing layer that imparts an anisotropic light condensing effect to light such that a light condensing degree in the normal direction of the light incident end surface is made larger and a light condensing degree in an orthogonal direction orthogonal to the normal direction is made smaller.

11. The display device according to claim 10, further comprising a diffusion member interposed between the display panel and the low refraction index layer to diffuse the light exiting through the light exit surface of the optical member, wherein the diffusion member includes an anisotropic diffusion layer that imparts an anisotropic diffusion effect to the light such that a light diffusion degree in the normal direction is made smaller and a light diffusion degree in the orthogonal direction is made larger.

12. The display device according to claim 9, further comprising a diffusion member interposed between the display panel and the low refraction index layer to diffuse the light emitted from the light exit surface of the optical member.

13. The display device according to claim 12, wherein the diffusion member includes at least a diffusion layer that diffuses light and a polarizing reflection layer that polarizes and reflects light.

14. The display device according to claim 9, further comprising a support member that supports at least the display panel from a side of the optical member.

15. The display device according to claim 9, wherein the low refraction index layer is a resin layer formed of a synthetic resin material.

16. A display device comprising:

a display panel having a display surface that displays an image;

a lighting device that supplies light to the display panel; and a light guide plate, wherein the lighting device includes a light source, and an optical member having at least a light exit surface through which the light emitted by the light source exits toward the display surface of the display panel, the optical member includes a light refraction portion that imparts an anisotropic refraction effect to at least light rays exiting through an edge section of the light exit surface to be oriented toward a center side of the display surface, the display device further comprises a low refraction index layer interposed between the display panel and the optical member, the low refraction index layer having a refraction index lower than at least a refraction index of the optical member, the light guide plate includes a light incident end surface and a light exit plate surface, the light incident surface being at least a part of an outer peripheral end surface of the light guide plate and through which the light emitted by the light source enters, and the light exit plate surface being one of a pair of plate surfaces of the light guide plate and through which the light exits, the light guide plate being arranged to be overlapped with the optical member, and an anisotropic light condensing member interposed between the light guide plate and the optical member, wherein the anisotropic light condensing member includes an anisotropic light condensing layer that imparts an anisotropic light condensing effect to light such that a light condensing degree in the normal direction of the light incident end surface is made larger and a light condensing degree in an orthogonal direction orthogonal to the normal direction is made smaller.

17. The display device according to claim 16, further comprising a diffusion member interposed between the display panel and the low refraction index layer to diffuse the light exiting through the light exit surface of the optical member, wherein the diffusion member includes an anisotropic diffusion layer that imparts an anisotropic diffusion effect to the light such that a light diffusion degree in the normal direction is made smaller and a light diffusion degree in the orthogonal direction is made larger.

18. The display device according to claim 16, further comprising a diffusion member interposed between the display panel and the low refraction index layer to diffuse the light emitted from the light exit surface of the optical member.

19. The display device according to claim 18, wherein the diffusion member includes at least a diffusion layer that diffuses light and a polarizing reflection layer that polarizes and reflects light.

20. The display device according to claim 16, further comprising a support member that supports at least the display panel from a side of the optical member.

21. The display device according to claim 16, wherein the low refraction index layer is a resin layer formed of a synthetic resin material.

* * * * *